US00RE41397E

(19) United States
(12) Reissued Patent
Latif et al.

(10) Patent Number: US RE41,397 E
(45) Date of Reissued Patent: Jun. 22, 2010

(54) METHOD AND APPARATUS FOR NETWORK INTERFACE CARD LOAD BALANCING AND PORT AGGREGATION

(75) Inventors: Faisal Latif, Fremont, CA (US); Pramod Sharma, Milpitas, CA (US); Suleman Saya, Santa Clara, CA (US); Jim J. Kuhfeld, Soquel, CA (US)

(73) Assignee: Adaptec, Inc., Milpitas, CA (US)

(21) Appl. No.: 10/704,464

(22) Filed: Oct. 22, 2003

Related U.S. Patent Documents

Reissue of:
(64) Patent No.: 6,393,483
Issued: May 21, 2002
Appl. No.: 08/884,794
Filed: Jun. 30, 1997

(51) Int. Cl.
*G06F 15/16* (2006.01)

(52) U.S. Cl. ..... 709/226; 709/239; 709/250; 370/230; 370/359; 370/419; 370/463; 710/200; 714/4

(58) Field of Classification Search ..... 709/226, 709/239, 242; 370/230, 359, 419, 463; 710/200; 707/250; 714/4, 2, 820
See application file for complete search history.

(56) References Cited

U.S. PATENT DOCUMENTS 4,658,396 A * 4/1987 Barden ..... 370/16
4,694,487 A * 9/1987 Chang et al. ..... 379/269
4,847,837 A * 7/1989 Morales et al.
5,179,550 A * 1/1993 Simpson ..... 370/54
5,239,537 A * 8/1993 Sakauchi
5,289,458 A * 2/1994 Taha ..... 370/16
5,329,520 A * 7/1994 Richardson ..... 370/16
5,335,227 A * 8/1994 Smith et al. ..... 370/95.1
5,361,250 A * 11/1994 Nguyen ..... 370/16.1
5,390,188 A * 2/1995 Dawson ..... 371/20.6
5,410,535 A * 4/1995 Yang et al. ..... 370/13
5,430,726 A * 7/1995 Moorwood et al.
5,448,559 A * 9/1995 Hayter et al. ..... 370/60.1
5,450,403 A * 9/1995 Ichii et al. ..... 370/85.1
5,459,714 A * 10/1995 Lo et al. ..... 370/13.1
5,479,608 A * 12/1995 Richardson ..... 395/182.02
5,490,252 A * 2/1996 Macera et al. ..... 395/200.01
5,526,492 A * 6/1996 Ishida ..... 395/200.09
5,586,121 A * 12/1996 Moura et al.
5,596,723 A * 1/1997 Romohr ..... 395/200.16
5,598,536 A * 1/1997 Slaughter, III et al. . 395/200.16
5,603,029 A * 2/1997 Aman et al. ..... 395/675
5,606,559 A * 2/1997 Badger et al.
5,606,664 A * 2/1997 Brown et al. ..... 395/200.1
5,646,936 A * 7/1997 Shah et al.

(Continued)

OTHER PUBLICATIONS

Matrox, Matrox 100 Multiport NIC, pp. 1–3, 1998.*
3COM, Core Builder 5000 Distributed Management Module User Guide, May 1997.*
3COM Core Builder 5000 Distributed Management Module Commands Guide, May 1997.*
3COM CoreBuilder 5000 Etherflex Module User Guide, May 1997.*

*Primary Examiner*—Douglas B. Blair
(74) *Attorney, Agent, or Firm*—Fish & Richardson P.C.

(57) ABSTRACT

Disclosed is a process for driving a network interface card. The process includes monitoring the status of a plurality of ports connected between a computer and a network. Detecting a failure in one of the plurality of ports connected to the network. Re-assigning data transmitted over the failed one of the plurality of ports to an active port of the plurality of ports [selected in a round robin technique]. The process further including receiving data over one of the plurality of ports designated as a primary receiving port. Preferably, when the failed one of the plurality of ports is the primary receiving port, the receiving tasks are assigned to a next active port [selected in a round robin technique].

36 Claims, 14 Drawing Sheets

U.S. PATENT DOCUMENTS 5,666,488 A * 9/1997 Joh
5,708,779 A * 1/1998 Graziano et al.
5,710,549 A * 1/1998 Horst et al. ..... 340/825.5
5,734,811 A * 3/1998 Croslin
5,742,587 A * 4/1998 Zornig et al. ..... 370/235
5,742,761 A * 4/1998 Olnowich et al.
5,754,552 A * 5/1998 Allmond et al. ..... 370/465
5,764,895 A * 6/1998 Chung
5,790,554 A * 8/1998 Pitcher et al.
5,793,746 A * 8/1998 Gerstel et al.
5,822,300 A * 10/1998 Johnson et al. ..... 370/229
5,828,569 A * 10/1998 Fisher ..... 700/82
5,828,879 A * 10/1998 Bennett ..... 395/672
5,838,681 A * 11/1998 Bonomi et al. ..... 370/395.41
5,982,744 A * 11/1999 Cantwell et al.
6,009,077 A * 12/1999 Firoiu
6,047,323 A * 4/2000 Krause ..... 709/227
6,067,619 A * 5/2000 Melvin et al. ..... 713/100
6,163,543 A * 12/2000 Chin et al. ..... 370/400
6,381,218 B1 * 4/2002 McIntyre et al. ..... 370/245
6,393,483 B1 * 5/2002 Latif et al. ..... 709/226
6,535,491 B2 * 3/2003 Gai et al. ..... 370/256
6,628,649 B1 * 9/2003 Raj et al. ..... 370/360
6,665,733 B1 * 12/2003 Witkowski et al. ..... 709/249
6,681,261 B2 * 1/2004 Mancusi et al. ..... 709/250
6,711,171 B1 * 3/2004 Dobbins et al. ..... 370/400
6,757,297 B1 * 6/2004 Chin ..... 370/469
6,763,438 B2 * 7/2004 Ogawa et al. ..... 711/157
6,789,118 B1 * 9/2004 Rao ..... 709/225

* cited by examiner

| STATUS | FUNCTION | PORTS | MAC ADDRESS | SOURCE ADDRESS |
|---|---|---|---|---|
| Active | (Primary Rx) $Tx_1$ | Port-1 | MAC-1 | SA-1 |
| Active | $Tx_2$ | Port-2 | MAC-2 | SA-2 |
| Active | $Tx_3$ | Port-3 | MAC-3 | SA-3 |
| Active | $Tx_4$ | Port-4 | MAC-N | SA-N |

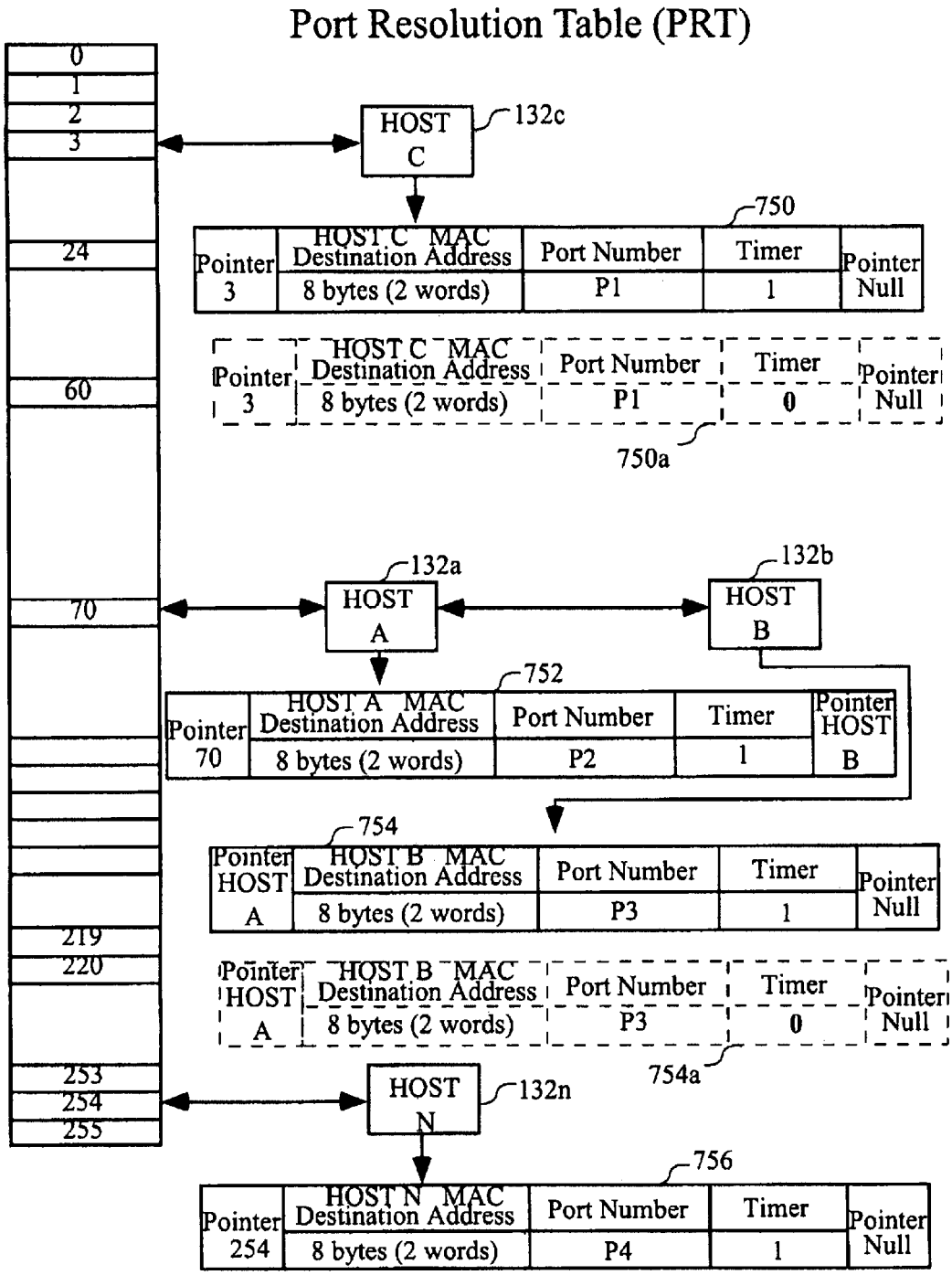
FIG. 7B
(AMENDED)

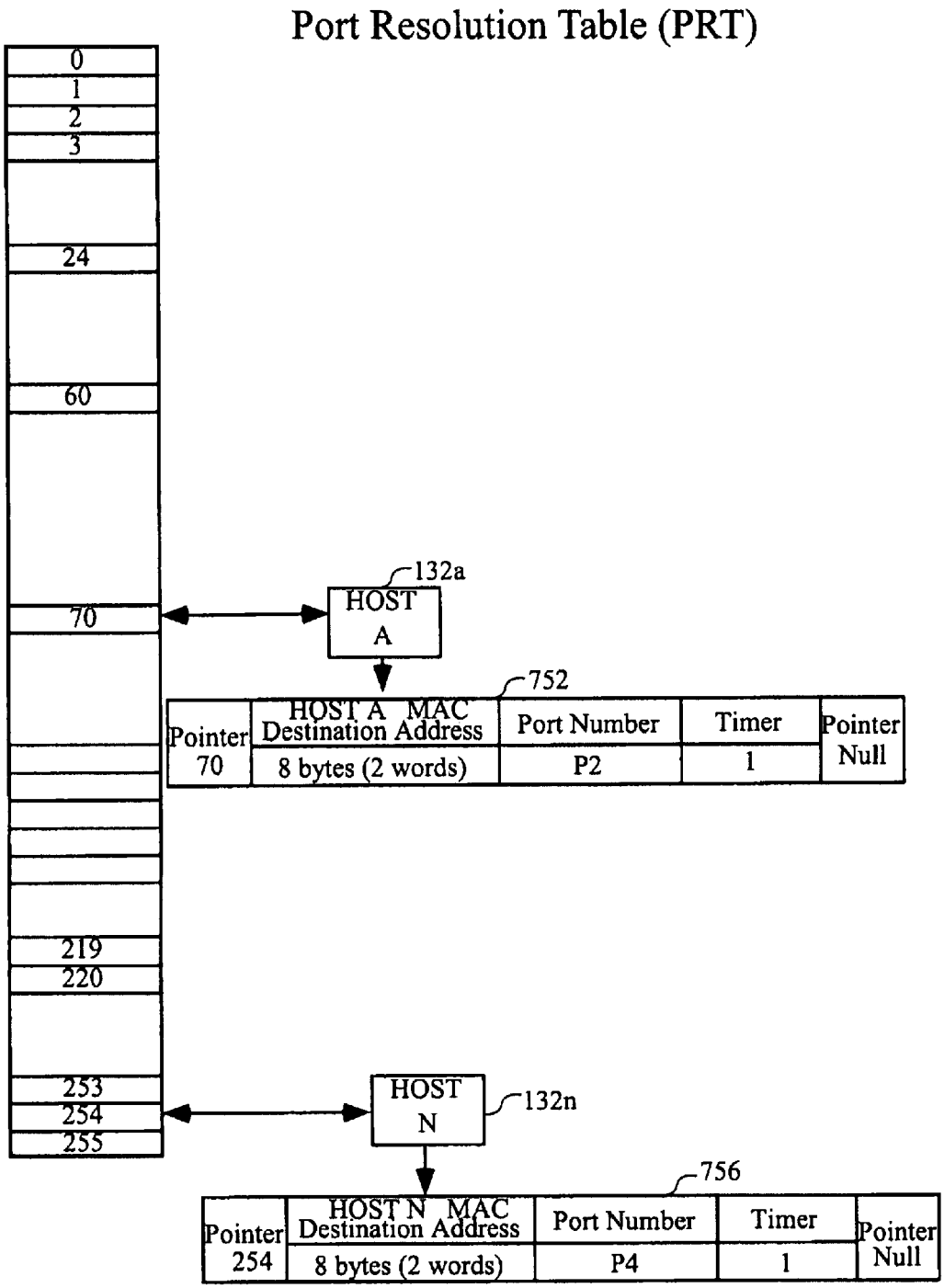
FIG. 7C
(AMENDED)

METHOD AND APPARATUS FOR NETWORK INTERFACE CARD LOAD BALANCING AND PORT AGGREGATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to computer networks, and more particularly to software drivers used for controlling network interface cards.

2. Description of the Related Art

Computers are increasingly being coupled together into computer networks. In typical networks, hardware devices known as network interface cards (NICs) are used by computer systems to enable them to communicate over networks with other computer systems. Commonly, NICs are available as plug in devices that are connected to a computer's interface bus (e.g., PCI Bus), or are built directly into a computer's mother board. Traditionally, a computer's NIC enables communication over a single computer network, such as a Local Area Network (LAN), which may include a multitude of switches and network devices. Through these network devices, remote hosts are capable of communicating with other similarly connected remote hosts or to a server computer system. Through these networks, remote hosts are able to, for example, request data from a server computer system, and the server computer system is able to transfer the requested data to the requesting host over the network. In response to the increased demand for resources stored on networked server computers, many NICs are now capable of communicating over more than one network. In this manner, data stored on one server computer system may be accessed by hosts coupled to different networks (e.g., different LANs).

FIG. 1 is a graphical illustration of a server computer system 20 having a NIC 30 that is coupled to more than one local area network. In this example, NIC 30 is a single card having four ports, where each of the four ports is connected to a different network. As such, NIC 30 is connected to a LAN-1 10, a LAN-2 12, a LAN-3 14 and a LAN-4 16, that enables an increased number of users to access data stored on server computer system 20. In this arrangement, each port of NIC 30 is capable of processing received (Rx) data (and requests for data) from remote hosts in addition to transmitting (Tx) data to remote hosts connected to one of the LANs shown in FIG. 1. Another traditional way of connecting server computer system 20 to multiple networks is to install a plurality of single port NICs (one for each network) to the interface bus of the server computer system 20. As is the case in multiple port NICs, each port of each NIC is capable of performing receive and transmit functions over its dedicated NIC.

Because NIC 30 is responsible for providing the communication path between a multitude of remote hosts, the loading experienced by NICs installed on a server computer system 20 are far greater than the typical loads experienced by NICs installed on the individual remote hosts. By way of example, server computer system 20 typically receives a few short requests from the remote hosts and then responds by transmitting out a great deal of data to the requesting hosts. In addition, because NIC 30 is only able to transmit out to each network at a fixed bandwidth (e.g., about 10 Mbps/100 Mbps), the server computer system 20 will unfortunately be tied up responding to data transmit request for extended periods of time.

Another common problem with conventional NICs is that access to server computer system 20 may be completely blocked-off to an entire network whenever one port fails to operate properly. By way of example, if port $P_1$ fails, all hosts connected to LAN-1 10 will be prevented from accessing data stored on server computer system 20. As is well known, port failures are common, and are typically caused by network overloads, NIC software driver bugs, NIC link interface failures, and NIC hardware failures. In any event, when a failure occurs, a large number of users attempting to access or transfer data between the server computer system 20 will be unable to accomplish their networking task. Typically, when a NIC port (e.g., port $P_1$) failure occurs, the server computer system 20 is typically shut down to all network traffic (i.e., LANs 10, 12, 14, and 16) while network technicians trouble shoot and fix the NIC port failure. Of course, network repairs may disable a network for several hours or even days.

As businesses continue to intensely network their operations, port failures will unfortunately lead to substantial losses in worker productivity. For example, many companies use a central server to network their employees that may be located in several remote office locations. As such, when the port servicing a particular office goes down, that entire office will be unable access shared data stored in the central server. NIC port failures are also common in large corporations such as, banks, hotel chains, and airlines that critically depend on real-time access to data stored on a central server computer. Consequently, NIC port failures are commonly to blame for significant yearly losses in revenue as well as lower customer satisfaction.

In view of the foregoing, there is a need for a network interface card(s) (NICs) that provide increased load balancing transmit throughput to networks connected to the NIC, while providing resilient backup capabilities that enable continues data transferring connections when port failures occur. Further, there is a need for NIC software drivers to intelligently detect port failures and automatically redistribute data transfer loads over functioning NIC ports.

SUMMARY OF THE INVENTION

Broadly speaking, the present invention fills these needs by providing methods and apparatus for increasing throughput in a load balancing manner over a multi-port NIC. Each port of the multi-port NIC preferably has its own link to the network, hub, or switch, which enables the multi-port NIC to reconfigure automatically to recover from a port failure. The multi-port NIC, driven by a smart NIC driver preferably reconfigures the multi-port driver by redistributing the load (both transmit and receive) over the remaining active ports. It should be appreciated that the present invention can be implemented in numerous ways, including as a process, an apparatus, a system, a device, a method, or a computer readable medium. Several inventive embodiments of the present invention are described below.

In one embodiment, a process for driving a network interface card is disclosed. The process includes monitoring the status of a plurality of ports connected between a computer and a network. Detecting a failure in one of the plurality of ports connected to the network. Re-assigning data transmitted over the failed one of the plurality of ports to an active port of the plurality of ports selected in a round robin technique. The process further including receiving data over one of the plurality of ports designated as a primary receiving port. In a preferred embodiment, when the failed one of the plurality of ports is the primary receiving port, the receiving tasks are assigned to a next active port selected in a round robin technique.

In another embodiment, a method for transmitting and receiving data over a network from a server computer system is disclosed. The method includes connecting a plurality of ports between the server computer system and the network for communicating with a plurality of remote hosts coupled to the network. Transmitting a load of data through the plurality of ports to the plurality of remote hosts. Detecting a failure in one of the plurality of ports during a transmit to a selected one of the plurality of remote hosts. The method further includes redistributing the load of data assigned to the failed one of the plurality of ports to an available port of the plurality of ports. Preferably, data is received through one of the plurality of ports designated as a primary receiving port.

In yet a further embodiment, a computer readable media containing program instructions for driving a network interface card is disclosed. The computer readable media includes program instructions for monitoring a status of a plurality of ports connected between a computer and a network. Program instructions for building a port resolution table indexing connections to at least one remote host that is communicating through a selected one of the plurality of ports. The computer readable media further includes program instructions for periodically updating the port resolution table after a predetermined time-out. Preferably, the at least one remote host is assigned host parameters identifying a media access control address of the at least one remote host, a number assigned to the selected one of the plurality of ports, and a timer.

In still another embodiment, a computer readable media containing program instructions for driving a network interface card is disclosed. The computer readable media includes program instructions for monitoring a status of a plurality of ports connected between a computer and a network. Program instructions for detecting a failure in one of the plurality of ports connected to the network. Program instructions for re-assigning data transmitted over the failed one of the plurality of ports to an active port of the plurality of ports selected in a round robin technique. The computer readable media further includes program instructions for receiving data over one of the plurality of ports designated as a primary receiving port.

In another embodiment, an apparatus for driving a network interface card is disclosed. That apparatus includes means for monitoring a status of a plurality of ports connected between a computer and a network. Means for detecting a failure in one of the plurality of ports connected to the network. Means for re-assigning data transmitted over the failed one of the plurality of ports to an active port of the plurality of ports selected in a round robin technique. The apparatus further includes means for receiving data over one of the plurality of ports designated as a primary receiving port.

Advantageously, the embodiments of the present invention provide a multi-port network interface card having a plurality of ports connected to a single network, and a smart network interface driver for controlling the functions of the multi-port card and interactions with existing server operating systems. As such, it should be appreciated that no changes are required to be made to existing operating systems or other applications to take advantage of the increased throughput and redundancy provided in accordance with the present invention. Further, all internal load balancing and aggregation provides a resilient network interface card that automatically reconfigures itself in case of failure to one or more of the ports, and the re-configuration occurs in real-time without requiring operator intervention. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 7B and 7C illustrate a port resolution table (PRT) timing routine performed in accordance with one embodiment of the present invention.

DETAILED DESCRIPTION OF THE PREFERRED EMBODIMENTS

An invention is described for methods and apparatus for increasing throughput in a load balancing manner over a multi-port NIC. The present invention also provides a smart NIC driver for managing loads over the multi-port NIC and redistributing loads over active ports when failures occur with a given port of the multi-port NIC. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

In one embodiment, the multi-port NIC is well suited for server computer systems that are required to transfer large amounts of data over a network in response to numerous short data requests. Preferably, the multi-port NIC of the present invention has each of its ports linked to the network, hub, or switch, and each port acts as an independent NIC having an associated bandwidth. Accordingly, the multi-port NIC of the present invention is capable of simultaneously transmitting data over each of the ports to a particular remote host located within a network with an aggregated bandwidth. By way of example, if each port of the multi-port NIC has a bandwidth of 100 Mbps, and the multi-port NIC is a 4-port card, the total aggregated bandwidth can be 400 Mbps, or higher for NICs with additional ports. Further, when ever a port of the multi-port NIC fails, the smart NIC driver that controls the operability of the multi-port NIC will automatically redistribute the load over the remaining ports that remain active.

Figure 1:
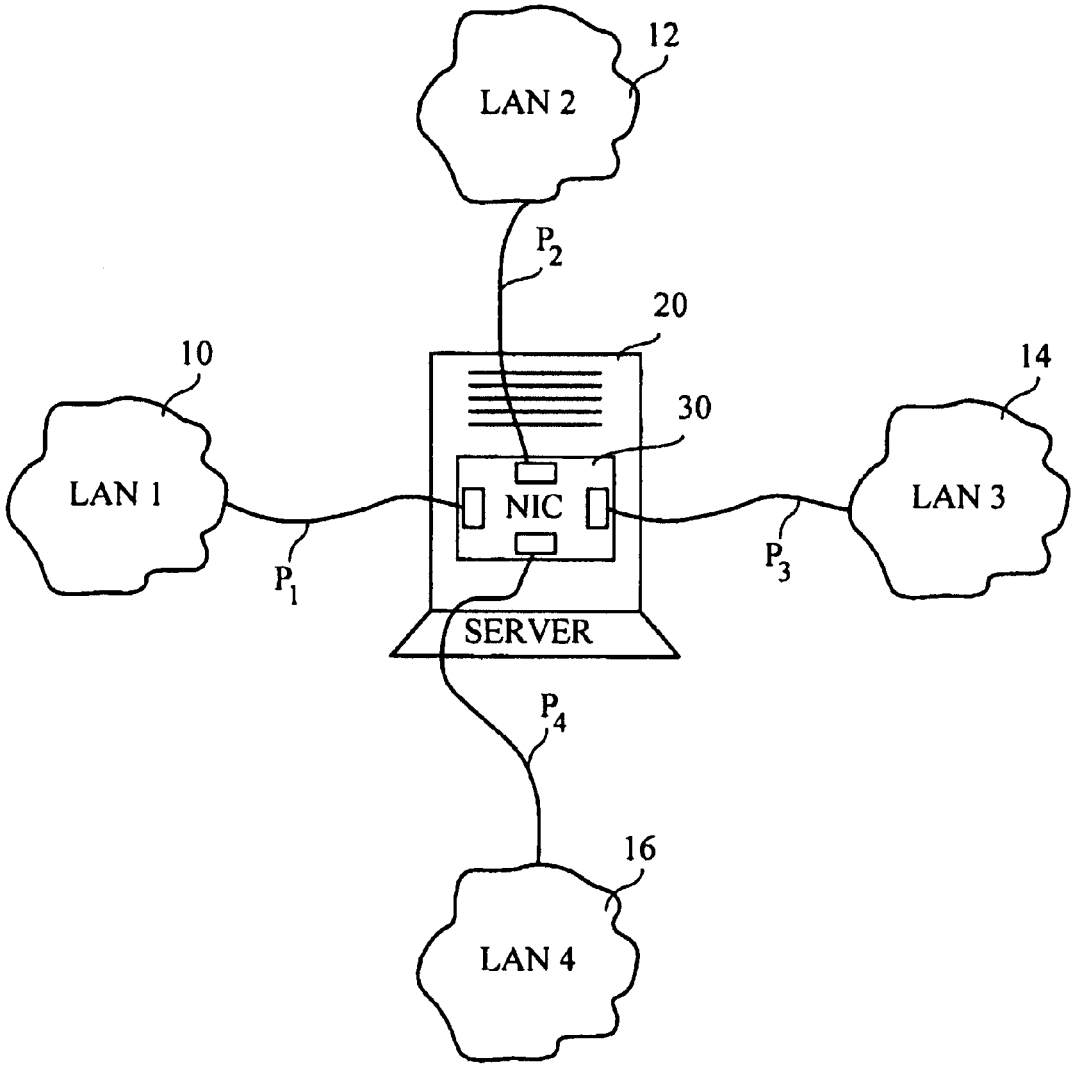
FIG. 1 (Prior Art)
FIG. 1 is a graphical illustration of a server computer system including a network interface card (NIC) coupled to more than one local area network.
Figure 2:
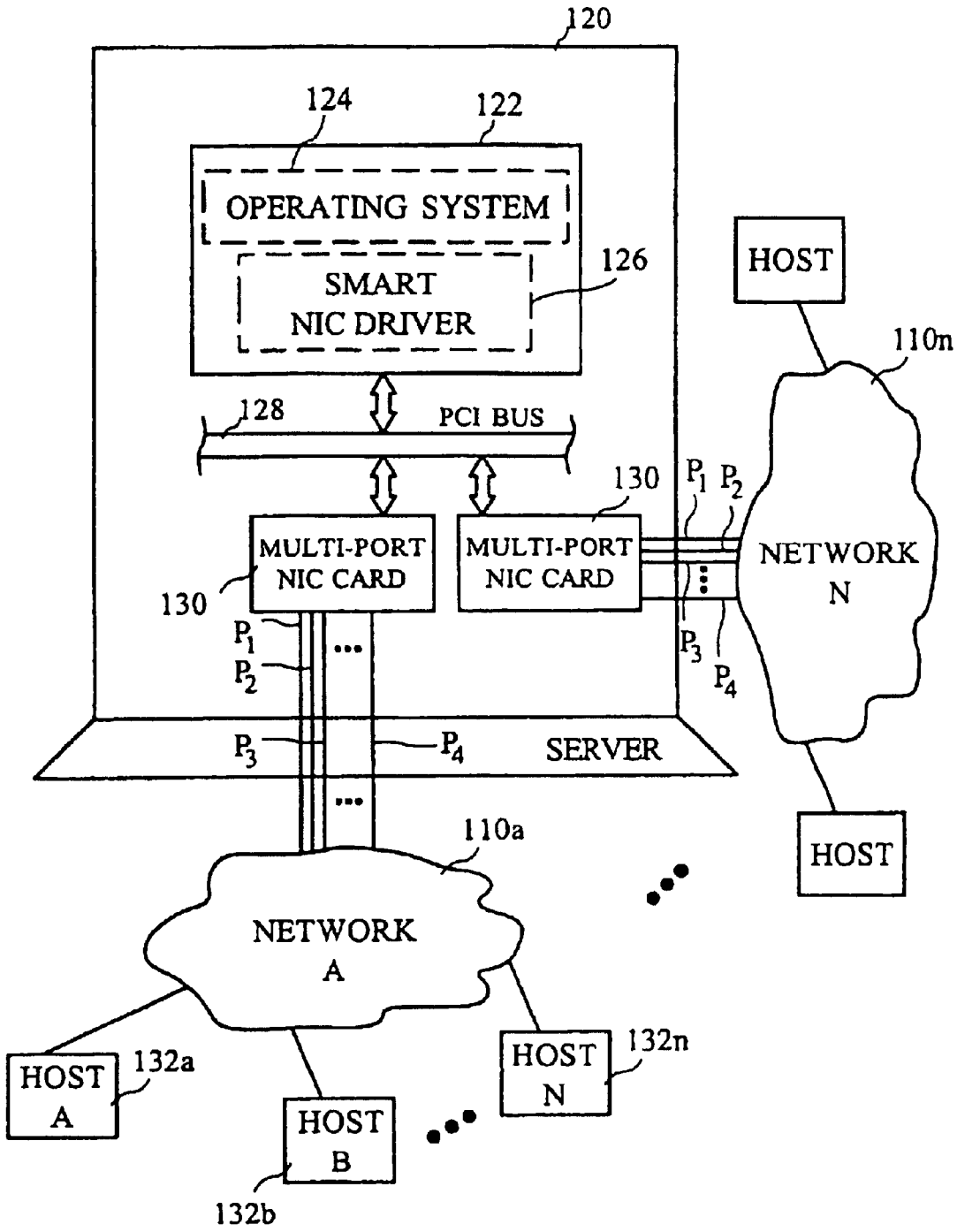
FIG. 2 is a pictorial diagram of a server computer system having multi-port NICs connected to a plurality of networks in accordance with one embodiment of the present invention.

FIG. 2 is a pictorial diagram of a server computer system 120 being connected to a plurality of networks 110a–110n in accordance with one embodiment of the present invention. Server computer system 120 has a random access memory (RAM) block 122 that has loaded therein an operating system 124 and a smart NIC driver 126. Generally, operating system 124 can be any suitable operating system including, Unix, DOS, Microsoft Windows 95, Microsoft Windows NT, Netware, Macintosh OS, etc. RAM block 122 is shown in communication with a PCI bus 128, which is also used to couple one or more multi-port NICs 130. In one embodiment, one multi-port NIC 130 is used to connect to a distinct network (e.g., LAN).

Preferably, the present invention uses a "single" instance of the smart NIC driver 126 to control each port of the multi-port NIC 130. In this manner, the operating system 124 is capable of interfacing with the smart NIC driver 126 to control the multiple ports of a multi-port NIC 130 in a manner that is transparent to the operating system 124. That is, although smart NIC driver 126 is controlling multiple ports to a single network, its interface with existing operating systems will be essentially identical to software drivers used to conventionally control data flow through a single port. Therefore, the smart NIC driver 126 is seamlessly able to communicate with any of the well established network protocols controlled by operating system 124, including TCP/IP, Netware and NetBEUI.

In the example of FIG. 2, one multi-port NIC 130 is shown having ports $P_1$, $P_2$, $P_3$ and $P_4$ connected to a Network-A 110a, that may have a multitude of hosts 132 connected to hubs, switches and routers within Network-A 110a. It should be understood that server 120 is capable of being networked to a number of separate networks by coupling associated multi-port NICs 130 to the PCI bus 128. Further, although only four ports are shown associated with each multi-port NIC 130, it should be understood that any number of ports may be added to suit the throughput needs of a particular system. As mentioned above, because each port of the multi-port NIC 130 has the data transfer capabilities of an independent NIC card, the transmit (Tx) throughput is aggregated by the number of ports in the multi-port NIC 130. Further, in one embodiment, the multi-port NIC 130 may include 12 internal independent NIC cards that make up 12 associated ports. In still another embodiment, the multi-port NIC 130 may include "3" 4-port cards to produce a combined number of 12 associated ports. In any event, each of the described ports should be understood to have the capabilities of an independent NIC. As an example, in one embodiment, multi-port NIC 130 can function to transmit about 1,200 Mbps (about 1.2 gigabits) by including 12 ports, each having data transfer rates of 100 Mbps.

Figures 3, 4:
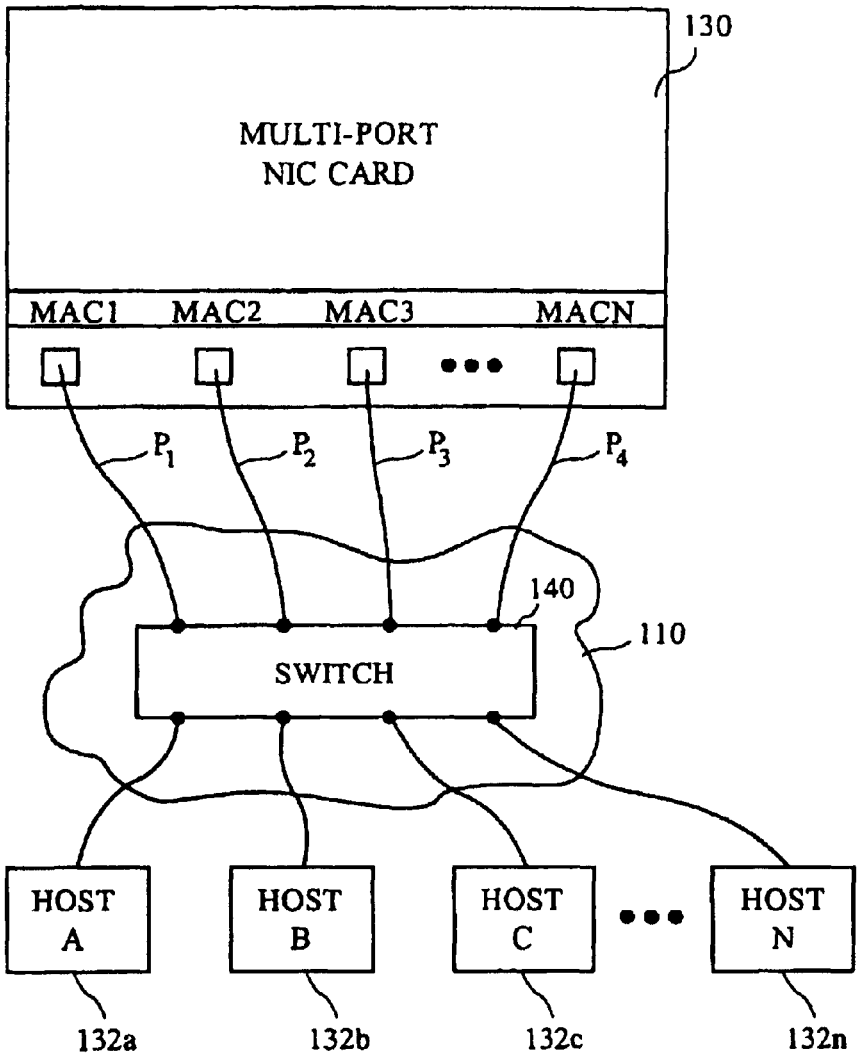
FIG. 3 shows a more detailed diagram of a multi-port NIC connected to a network in accordance with one embodiment of the present invention.
FIG. 4 shows a table containing status, function, ports, MAC addresses, and source addresses of the exemplary network connections illustrated in FIG. 3 in accordance with one embodiment of the present invention.

FIG. 3 shows a more detailed diagram of a multi-port NIC 130 connected to a network 110 in accordance with one embodiment of the present invention. As shown, multi-port NIC 130 has ports $P_1$, $P_2$, $P_3$, and $P_4$ connected to node inputs on a switch 140 located within network 110. Further, each port of Multi-port NIC 130 has an associated Ethernet media access control (MAC) address assigned to each port. As such, when port $P_1$ communicates with switch 140, switch 140 will know which port of multi-port NIC 130 transmitted the data to switch 140 by inspecting the source address "SA" of any received packet. In a similar manner, if ports $P_2$, $P_3$ or $P_4$ transmit data through switch 140, switch 140 will be able to ascertain the MAC address of each of those respective ports transferring data to network 110.

To manage packet switching, switch 140 typically creates routing tables and stores packet data in queues before routing the data to its destination, which may be any one or more Hosts 132a through 132n, that may be connected to switch 140 of network 110. Although only one switch has been illustrated for ease of description, it should be understood that typical networks include a multitude of network devices interconnecting a plurality of hosts through many hubs, switches, repeaters, bridges and routers.

FIG. 4 shows a table containing status, function, ports, MAC addresses, and source addresses of the exemplary network connections illustrated in FIG. 3 in accordance with one embodiment of the present invention. In this embodiment, port $P_1$ is designated as a primary receiving (Rx) port as well as a transmitting ($Tx_1$) port, while ports $P_2$, $P_3$ and $P_4$ are designated as transmit ports $Tx_2$, $Tx_3$ and $Tx_4$, respectively. As mentioned above, each port will also have an associated MAC address that is appended to outgoing packets as a source address "SA". Accordingly, when packets are transmitted through port $P_1$, each packet will necessarily have the SA-1 associated with MAC-1.

It is important to note that each one of the ports $P_1$, $P_2$, $P_3$, and $P_4$ may transmit data through switch 140 at the same time in a load balanced manner which advantageously enables multi-port NIC 130 to increase its transmit throughput. For example, assume that ports $P_1$, $P_2$ and $P_4$ are currently transmitting packets through switch 140 of network 110, and when a new transmit request is received for a new host (currently not in the PRT table) by multi-port NIC 130, the smart NIC driver 126 of FIG. 2 will examine each of the transmit ports $Tx_1$, $Tx_2$, $Tx_3$ and $Tx_4$. Based on this examination, the smart NIC driver 126 will determine weather any port is currently free (i.e., not transmitting data), and then assign the new transmit request to the next free port, chosen in a round robin manner. In this example, port $P_3$ is free, and therefore smart NIC driver 126 will assign the new data transmit request to port $P_3$. On the other hand, if no free port remained, the smart NIC driver 126 would be configured to assign the new packet transmit request to the least busiest port (i.e., the port having the lightest load) currently transmitting to network 110.

As mentioned above, port $P_1$ is preferably designated as the primary receive (Rx) port assigned all receiving tasks of packet data coming from Hosts 132a through 132n shown connected to network 110. Because NICs resident in server computers are typically requested to transmit out substantially more data than it is required to receive, only one port is actually necessary for efficiently performing the receive functions of multi-port NIC 130. However, if port $P_1$ fails for any reason, smart NIC driver 126 will automatically re-assign the receive (Rx) tasks to the next active port (in a round robin orientation) of multi-port NIC 130. Once assigned to the next active port, the port that is now assigned with the receiving task will also be assigned the Ethernet MAC address of port $P_1$. In this manner, all upper layer protocols will continue sending data to the same destination address "DA" associated with the Ethernet MAC address of $P_1$.

It is important to point out that because the primary Rx's Ethernet MAC address is assigned the port taking over the receiving functions, all external hosts connected to the network 110 will be unable to tell a difference in the internal and transparent re-assignment of server 120 receiving functions. As such, the internal re-assignment of the primary Rx Ethernet MAC address is transparently controlled by the smart NIC driver 126, and all that external hosts understand is that the multi-port NIC 130 is continuing to function smoothly and uninterrupted.

In one embodiment, if the primary Rx Ethernet MAC address is re-assigned to another port, the port newly assigned with the receiving Rx functions will also transmit (Tx) using the source address "SA" of the primary. By way of example, assuming that the primary Rx port $P_1$ were to fail, and the next active port was port $P_2$, then when port $P_3$ transmits a packet over the network, that transmitted packet will have the source address SA-1 associated with $P_1$. As will be described in greater detail with reference to FIG. 10, the smart NIC driver 126 is set to perform a link check timer (LCT) routine for determining the status of all ports of the multi-port NIC 130. During the LCT routine, if the primary Rx comes up (i.e., returns to an active state) from the its failed state, the smart NIC driver 126 will perform logical operations to ascertain whether it is proper to re-assign the receiving tasks to the primary Rx port $P_1$. In any event, the smart NIC driver 126 is well suited to detect failures in any of the multiple ports (including the primary Rx port), and then perform load balancing to re-assign the load to the remaining active ports of the multi-port NIC 130.

In a like manner, if any one of the transmit ports, e.g., port $P_3$ fails at any point during a transmission, the load assigned to port $P_3$ will be redistributed in a round robin manner to the next active and free port of multi-port NIC 130. However, if all ports that remain active are currently busy (i.e., not free), then the load of port $P_3$ will be assigned to the least busiest of the remaining ports, thereby enabling efficient load balancing over the remaining active ports.

Figure 5A:
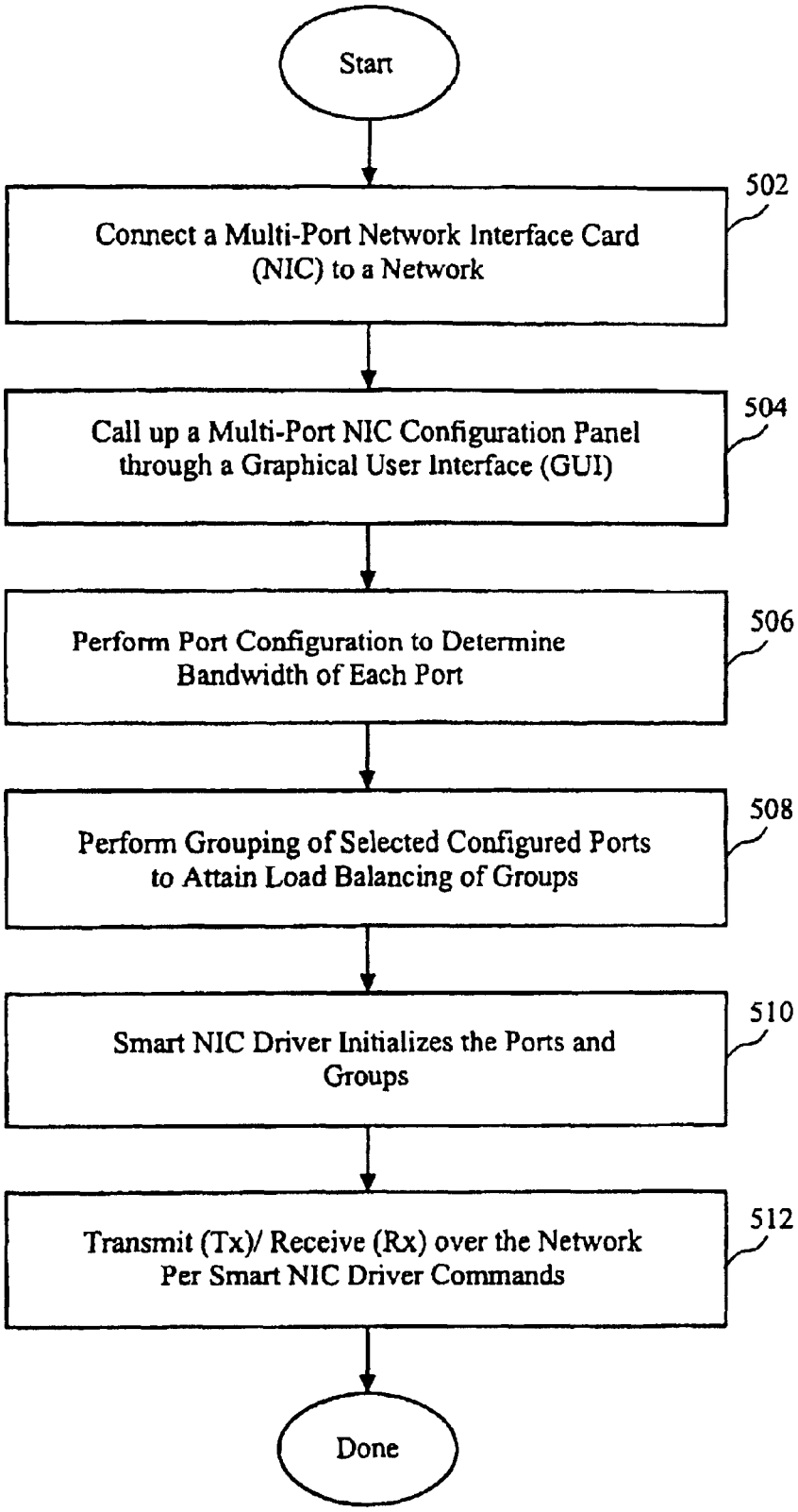
FIG. 5A is an overview flowchart diagram illustrating the method operations associated with implementing a multi-port NIC in accordance with one embodiment of the present invention.

FIG. 5A is an overview flowchart diagram illustrating the method operations associated with implementing a multi-port NIC 130 in accordance with one embodiment of the present invention. The method begins at an operation 502 where a multi-port NIC 130 is connected to a network as shown in FIG. 3. By way of example, if multi-port NIC 130 is a 4-port card, then each port of multi-port NIC 130 will be connected to a node of the network 110, which may include a switch 140, a hub, a bridge, a router, a repeater or other network interconnection device. In a preferred embodiment, multi-port NIC 130 is preferably installed to a PCI bus 128 of a server computer system 120 or other network device requiring the ability to transmit at increased load balancing throughput while ensuring superior fail-over resiliency in case one or more ports fail to operate properly.

Figure 5B:
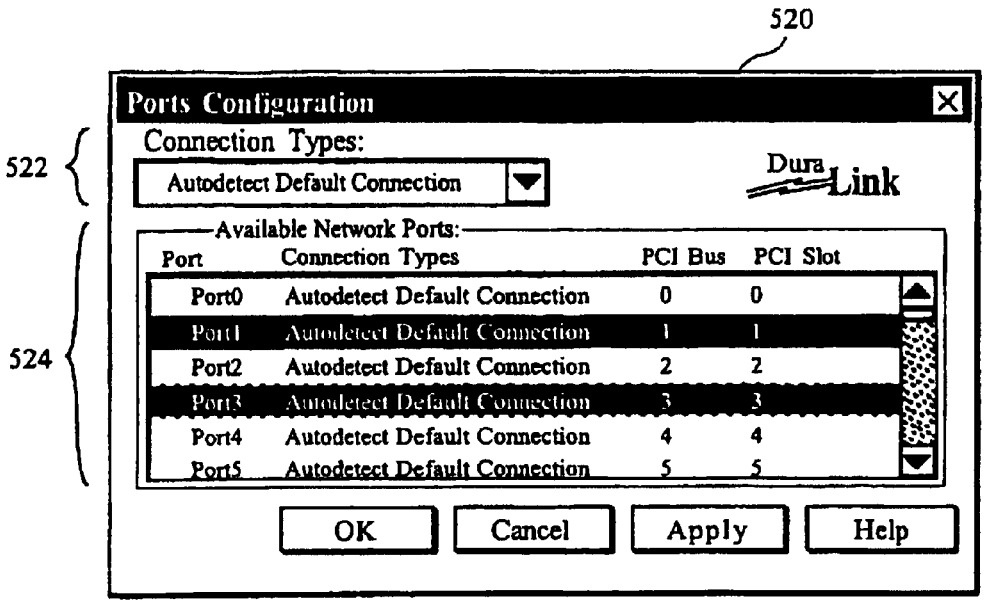
FIGS. 5B through 5D illustrate exemplary graphical user interfaces (GUI) for set-up and configuration of the multi-port NIC in accordance with one embodiment of the present invention.

Once multi-port NIC 130 has been installed into a computer and connected to a network, the method proceeds to an operation 504 where a multi-port NIC 130 configuration panel is called up in the form of a graphical user interface (GUI). The method then proceeds to an operation 506 where port configuration is performed for each port in the multi-port NIC 130 to ascertain the bandwidth (e.g., 10 Mbps, 100 Mbps, etc.) of each port. By way of example, as shown in FIG. 5B below, a port configuration GUI 520 is shown having an available network port window 524 listing all ports that may be connected to the multi-port NIC 130. In one embodiment, the ports displayed in available network ports window 524 are provided from an operating system registry which holds all available network ports that have been previously installed.

By default, the connection type for the available network ports is set to "auto detect default connection" which is configured to ascertain the type of connection associated with each of the particular ports. However, if the user desires to manually change the connection types, the connection types window 522 may be modified through the drop-down list box to make an appropriate change. Once the changes are made, the apply icon button is preferably selected to implement the newly entered connection types.

Figure 5C:
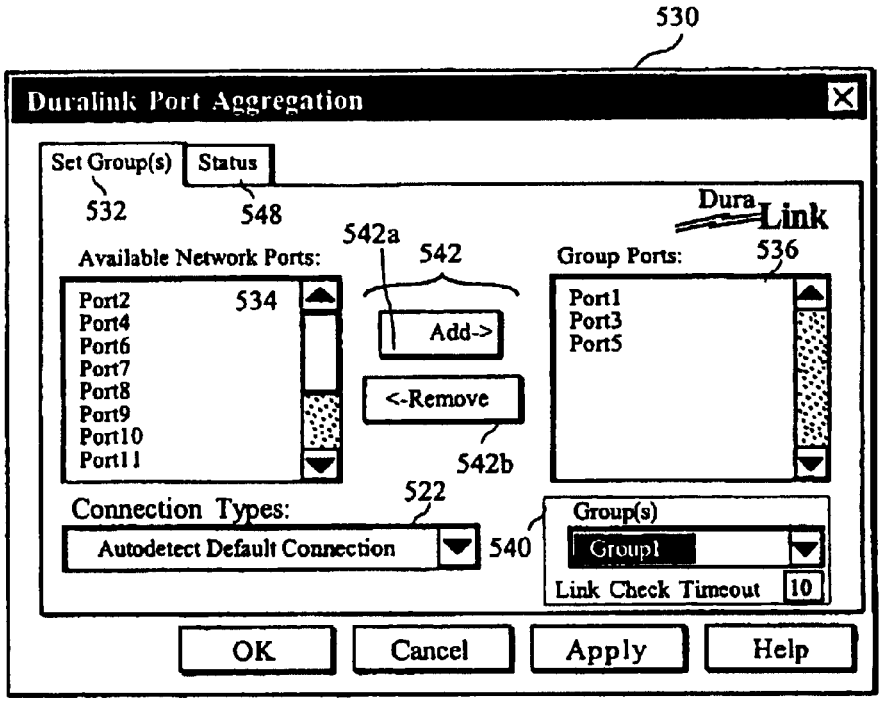

Referring back to FIG. 5A, once each port has been configured for bandwidth in FIG. 5B, the method proceeds to an operation 508 where grouping of selected configured ports is performed to attain desired load balancing for the groups. By way of example, once port configuration has been performed in FIG. 5B and the OK icon has been selected from ports configuration GUI 520, a port aggregation GUI 530 is presented to the user as shown in FIG. 5C. In port aggregation GUI 530, the user is able to create groups by selecting ports from the available network ports list 534 and then adding and removing ports through buttons 542.

By way of example, when a port is selected from the available port list 534 and the ADD button 542a is clicked, the selected port will be shifted to a group ports list 536. Of course, ports may also be removed from the group ports list 536 by clicking remove button 542b after a port is selected from the group ports list 536. Once the selected ports are moved in or out of the group ports list 536, the user may name that group in a groups window 540, where a link check time-out is provided. As will be described in greater detail below, the link check time-out (LCT) is used to check the activity of the selected ports during operation. In the example shown, the LCT time is set to 10 seconds, however, the LCT timer may be set to any number of seconds between about 1 second and about 20 seconds.

Figure 5D:
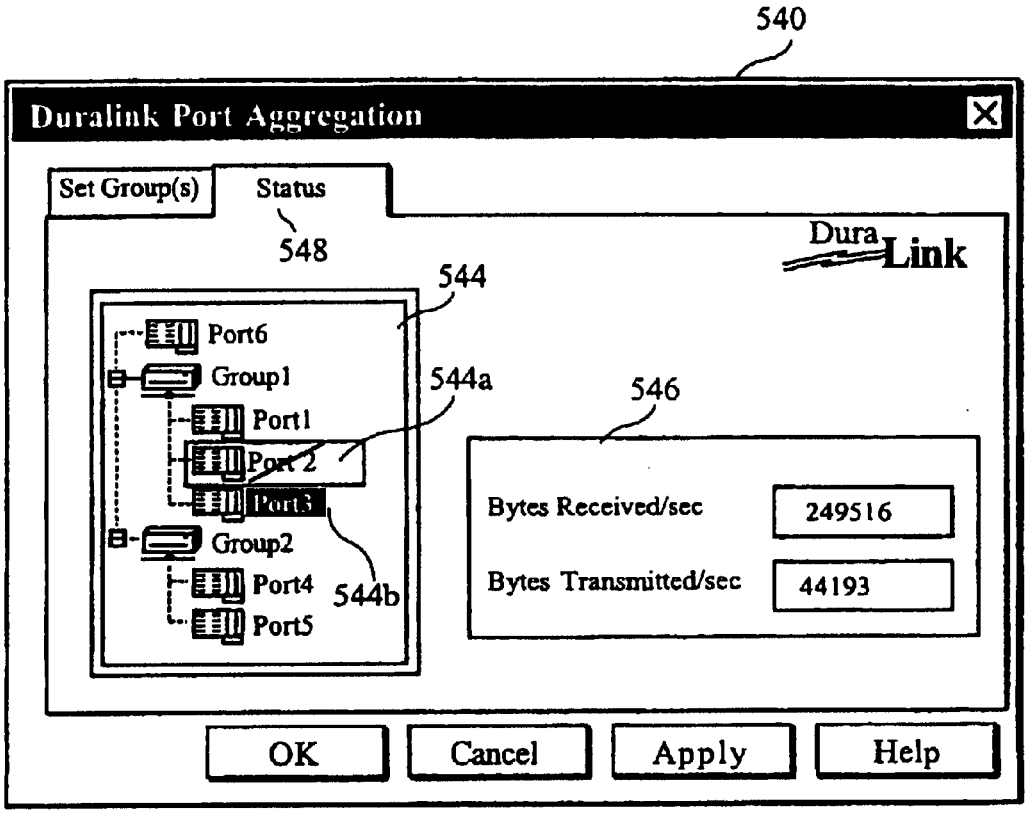

If the user selects the status icon 548 within the port aggregation GUI 530, a port aggregation window 540 of FIG. 5D is provided to graphically display whether any of the ports within a particular group is active or inactive. For example, window 544 illustrates that Group 1 (having ports $P_1$, $P_2$ and $P_3$) has port $P_2$ 544a in an inactive state, which is indicated by a cross-out icon, or may be indicated by any other graphical indicator signaling inactivity. However, port $P_1$ and port $P_3$ are shown currently active. To ascertain the load activity of a particular port, the user may simply select the icon of a particular port, e.g., port $P_3$, and data for the number of bytes received per second and the number of bytes transmitted per second, are displayed to the user in status window 546.

Returning to FIG. 5A, once the ports are configured and the groups are configured for load balancing in operations 506 and 508, the method proceeds to an operation 510 where the smart NIC driver 126 initializes the ports and groups selected by the user through the graphical user interfaces. Once smart NIC driver 126 has completed its initialization task, the method may proceed to an operation 512 where the multi-port NIC 130 transmits and receives over the network through the control of the smart NIC driver 126. In a preferred embodiment, the install and set-up of load balancing for the multi-port NIC 130 may be conducted through the above described GUIs loaded in a Windows based machine.

Figure 6:
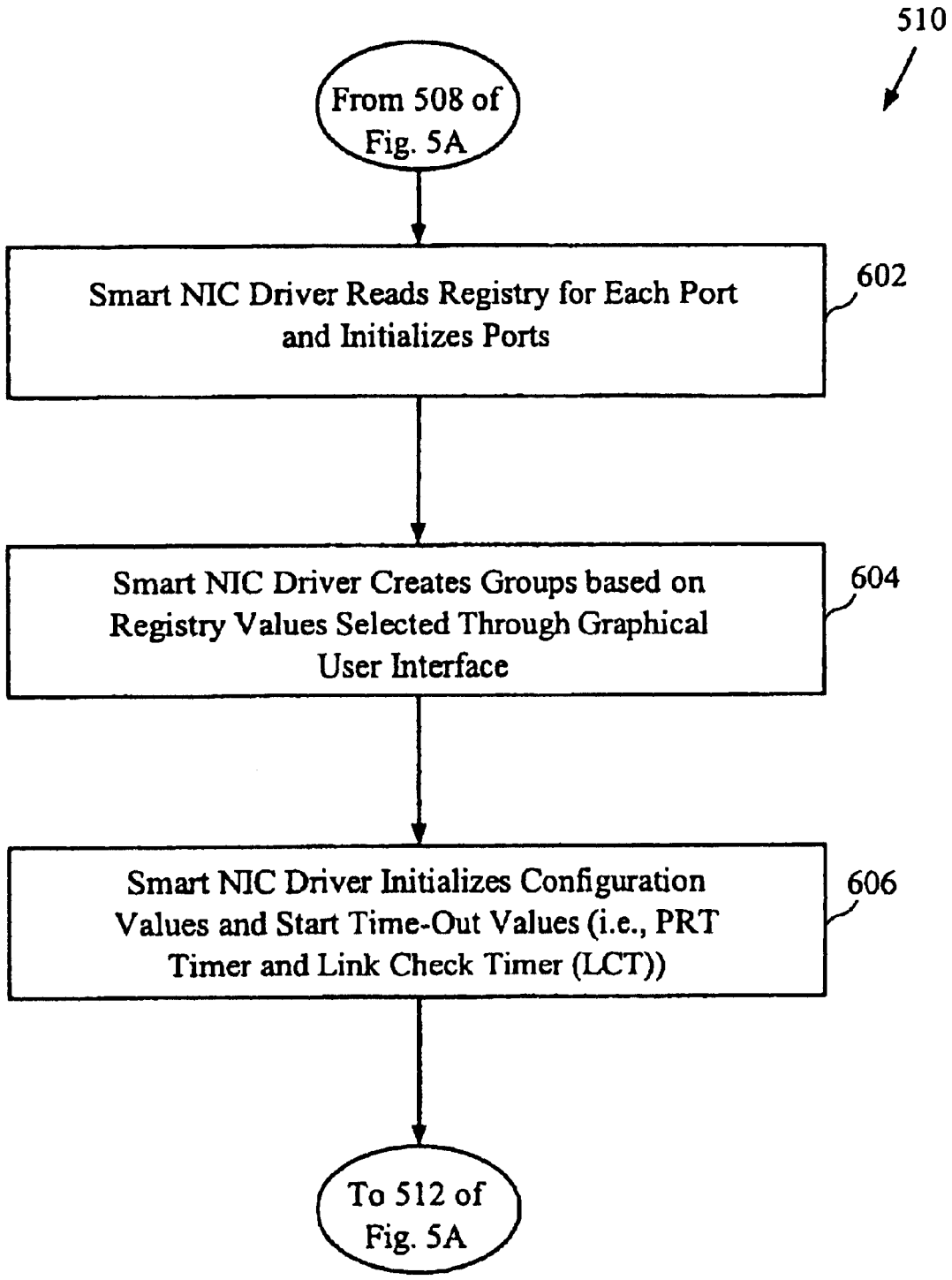
FIG. 6 is a more detailed flowchart diagram of the initialization performed by a smart NIC driver in accordance with one embodiment of the present invention.

FIG. 6 is a more detailed flowchart diagram of operation 510 of FIG. 5 in accordance with one embodiment of the present invention. The initialization of the ports and the groups begins at an operation 602 where the smart NIC driver 126 reads the operating system registry entries for each port and initializes the ports. For example, the ports configured for each group in FIG. 5C are initialized to ascertain the connection types for the associated ports. In one embodiment, the initialization also includes the transmission of a packet by the transmitting ports other than the primary Rx (i.e., $Tx_2$, $Tx_3$ and $Tx_4$) to the primary Rx port in order to verify that the transmitting ports are indeed connected to one network. By way of example, assume that the network administrator erroneously connected one port, e.g., port $P_2$ that is shown connected to network A 110a of FIG. 2, to network N 110n, then the Rx port would not receive the transmitted packet sent by $Tx_2$. As such, if the packet is not received from $Tx_2$, then the smart NIC driver 126 would known during the initialization process that port $P_2$ is not connected to network A 110a, and therefore the smart NIC driver 126 will not send packets through port $P_2$.

Next, the method proceeds to an operation 604 where the smart NIC driver 126 creates registry groups from the registry values associated with the groups configured through the graphical user interfaces. Once the smart NIC driver 126 creates the groups as shown in FIG. 5D, the method proceeds to an operation 606 where the smart NIC driver 126 initializes the configuration values and start time-out values associated with the multi-port NIC 130. By way of example, the start time-out values include a port resolution table (PRT) timer and a link check timer (LCT). As will be described in greater detail below, the PRT time is used to march through a PRT table and remove entries for those hosts that are not in use for a predetermined period of time, and the LCT timer is used to monitor the activity of all ports for another predetermined period of time. As such, these timers assist in efficient load balancing among active ports of the multi-port NIC 130. Once the configuration values and start time-out values are initialized in operation 606, the method proceeds to operation 512 of FIG. 5.

Figure 7A:
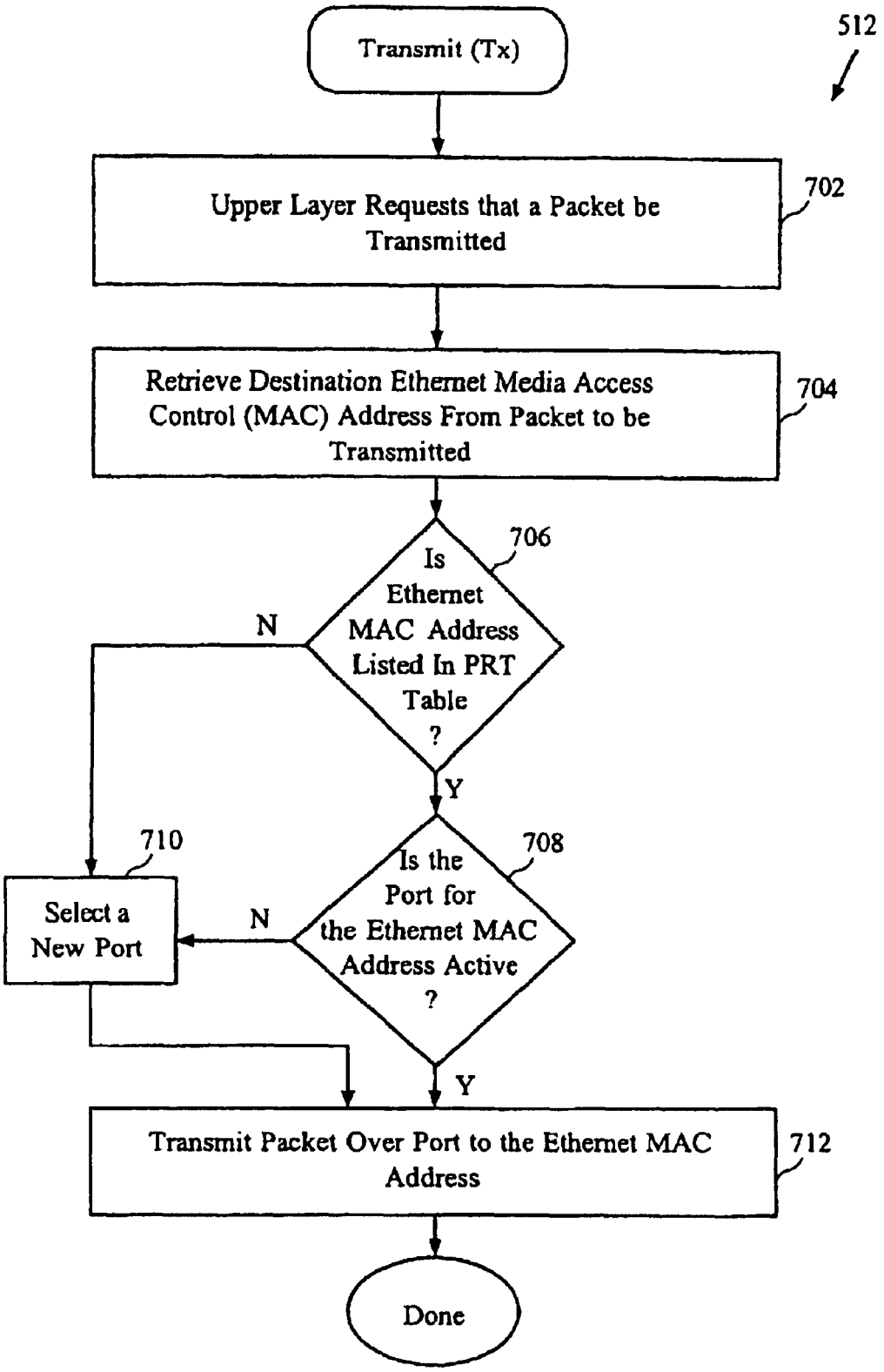
FIG. 7A illustrates the method operations associated with performing transmits (Tx) through the various ports of the multi-port NIC in accordance with one embodiment of the present invention.

FIG. 7A illustrates the method operations associated with performing transmits (Tx) through the various ports of the multi-port NIC 130 in accordance with one embodiment of the present invention. The method begins at an operation 702 where the multi-port NIC 130 receives a request from an upper layer to transmit packets to a networked remote host. By way of example, the application layer which may be a Ping application, an FTP application, or a Telnet application that communicates with the smart NIC driver 126 that enables communication with the multi-port NIC 130 (to perform the desired transmit requests).

The method then proceeds to an operation 704 where the destination Ethernet media access control (MAC) address is retrieved from packets that are to be transmitted over the network. By way of example, if a data packet is requested to be transmitted to a remote Host A, then the destination address "DA" of the Host A will be retrieved from the packet that is to be transmitted. The method then proceeds to a decision operation 706 where it is determined whether the retrieved Ethernet MAC address is currently listed in a PRT table.

By way of example, FIG. 7B illustrates a port resolution table (PRT) in accordance with one embodiment of the present invention. PRT table is essentially a lookup table that lists hosts that may be connected to a port of the multi-port NIC 130 at a certain point in time. By way of example, when a packet is initially assigned to be transmitted to a particular Host 132 having an associated destination address "DA," the smart NIC driver 126 will examine the 6th byte of the destination address "DA" to obtain an index number to an array of 255 entries in the port resolution table (PRT).

If the examination of the 6th byte of the destination address "DA" of the packet to be transmitted returns, for example, a number 3, then the entire destination address "DA" of the packet being transmitted is compared to the MAC destination address of any hosts linked to the entry indexed in the PRT table. In this example, only one Host C 132c is linked to index number 3, and therefore the comparison of the DA of the packet being sent and the MAC destination address of Host C 132c should match up. However, as will be described below, if there are multiple hosts doubly linked to the same index number (i.e., both hosts have the same 6th byte) then the comparison is done for those multiple hosts that are doubly linked. Although destination and source addresses are typically 6 bytes long, comparison are preferably performed based on 8 bytes (two words) at one time to improve processing efficiency. That is, additional zero values are added to the 6 bytes of the SA and DA to ensure that comparisons are based on two words. It should be appreciated that this lookup table comparison technique is well suited to reduce the amount of processing required by the CPU of the computer containing the multi-port NIC 130, thereby reducing the number of possible CPU interrupts.

Assuming that the first packet to be transferred through multi-port NIC 130 (i.e., when none of the ports are currently in use) is a packet destined for Host C 132c as described above, then the first available port $P_1$ will be selected in a round robin selection technique. As pictorially shown in FIG. 7B, Host C 132c (being linked to index number 3 of the PRT table) has an associated parameters box 750 identifying port $P_1$ as the selected port, a timer set to "1," indicating current transmission, a HOST C MAC destination address of Host C 132c, a pointer to index number 3 at one end, and a pointer to null at the other end. The pointer to null indicates that there are no other hosts sharing the same 6th byte of their MAC destination addresses. However, Host A 132a and Host B 132b do share the same 6th byte of their MAC destination address and therefore, are coupled in a doubly-linked manner, where a parameters box 752 of Host A 132a points to index 70 at one end, and points to Host B at the other end. In a like manner, a parameters box 754 of Host B 132b points to Host A 132a at one end and points to null at the other end.

Continuing with the example of FIG. 7B, the second packet transfer performed by Multi-port NIC 130 was designated for Host A 132a, and the next succeeding data transfer was directed for Host B 132b. Because port assignment is carried out in a round robin technique, ports $P_2$ and $P_3$ will be assigned to Host A 132a and Host B 132b, respectively. In a like manner, when Host N 132n is requested as the designated remote host, the smart NIC 126 will select the next available port, which is port $P_4$ as shown in a parameters box 756 associated with Host N 132n. It should be understood that data transfers may be performed simultaneously through each of the transmit ports and therefore, are shown having a number "1" in the timers of parameter boxes 750, 752, 754, and 756.

As will be described with reference to FIG. 9 below, a PRT timer routine is controlled by the smart NIC driver 126 which scans all indices of the PRT table and associated connected hosts to determine whether they are or are not actively transmitting data. In an initial scan, if the timer is currently set to "1," then the timer will be changed to "0" if the port is inactive. After a predetermined time-out, the smart NIC 126 will again scan all indices (i.e., from 0 to 255) of the PRT table and associated hosts, and again change all timers that are currently set to "1," to "0." However, if the timer is already set to "0," the smart NIC driver 126 will remove the connection to that remote host, and thereby make the port assigned to that host free.

Returning to FIG. 7A, if it is determined in operation 706 that the MAC destination address of a desired remote host is currently listed in the PRT table of FIG. 7B, then the method will proceed to a decision operation 708 where it is determined if the port for the Ethernet MAC address is active. For example, if the host is inactive due to a link failure or port failure, it will be considered in-active in operation 708. As shown in FIG. 7B, if data is to be transmitted to a particular remote host having an associated Ethernet MAC address, and a port was previously assigned to transmit to that remote host, all future packets destined for that remote host will preferably be queued up for transmission through that port. By way of example, because a connection exists in Host C 132c through port $P_1$, all data targeted for Host C will continue to pass through port $P_1$ until a failure occurs.

Alternatively, if it is determined in operation 708 that the port for the Ethernet MAC address is not active, the method will proceed to an operation 710 where a new port is selected for transmission to a desired remote host. Once a new port is selected from the remaining active ports (or least busiest) in a round robin technique, the method will proceed to an operation 712 where the packet(s) are transmitted over the port to the desired Ethernet MAC address of the recipient host.

Figure 8:
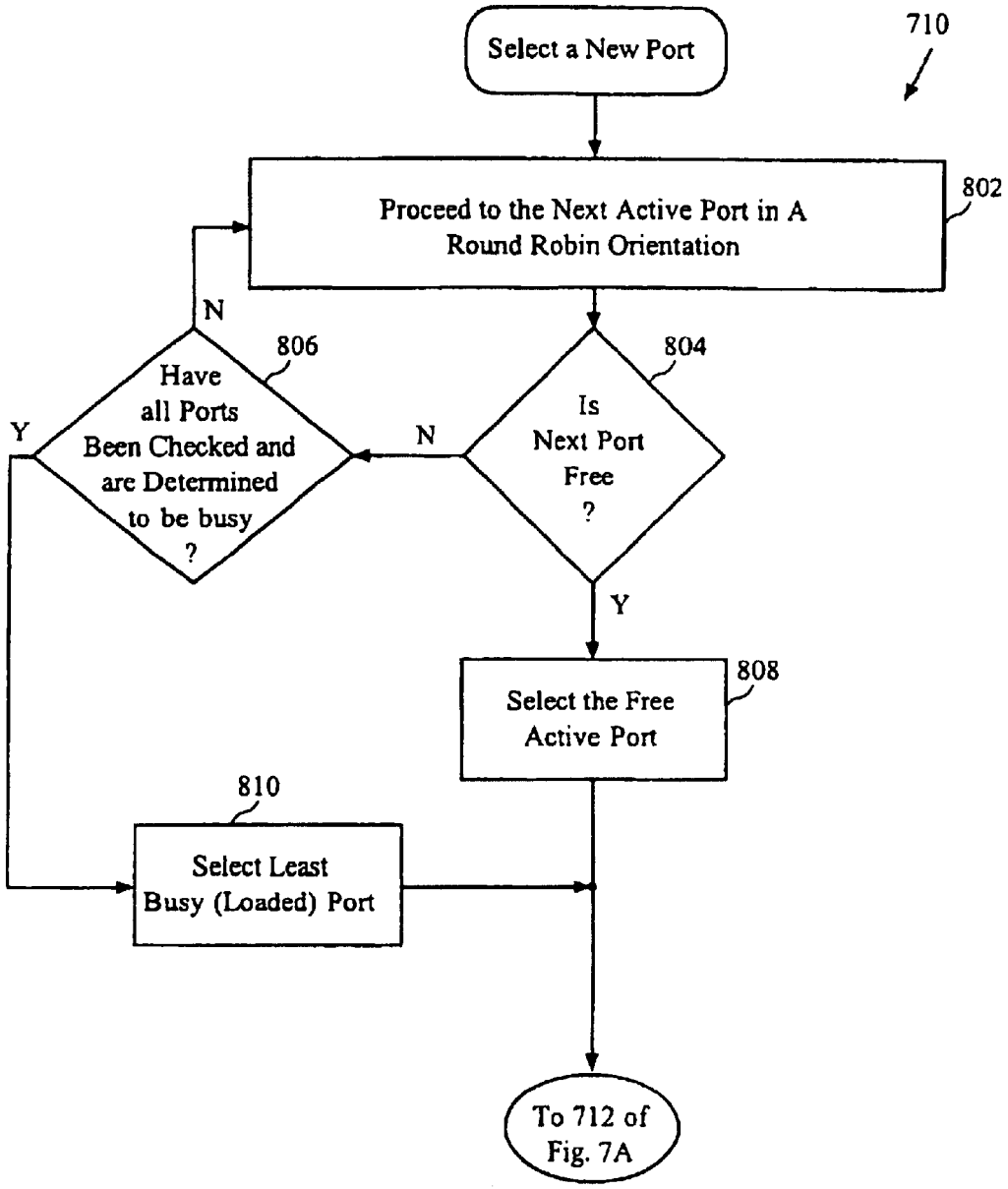
FIG. 8 illustrates the method operations performed in selecting a new port when a current port is inactive or is not currently listed in the PRT table in accordance with one embodiment of the present invention.

FIG. 8 illustrates the method operations performed in selecting a new port as described in operation 710 of FIG. 7A in accordance with one embodiment of the present invention. This method begins at an operation 802 where selection of a new port is performed by proceeding to the next active port in a round robin orientation. For example, if multi-port NIC 130 is a 4-port card and selection begins at port $P_1$, then the next port in a round robin orientation will be port $P_2$, then port $P_3$, then port $P_4$ and then back to port $P_1$. Once the next active port is selected in operation 802, the method proceeds to a decision operation 804 where it is determined if the next port in the round robin orientation is free. That is, the port is free if it is currently not transmitting packet data to a remote host, and if it is not indexed to the PRT table of FIG. 7A. If the next port is free, then the method will proceed to an operation 808 where the free active port is selected for transmission.

On the other hand, if it is determined that the next port is not free in operation 804, the method will proceed to an operation 806 where it is determined whether all ports have been checked and been determined to have been busy. If all ports have been not been checked and been determined to have been busy, the method will proceed back to operation 802 where the method proceeds to select the next active port in a round robin orientation. Once the next active port is selected, the method will again proceed to decision operation 804 where it is determined if this next port is free. If it is again determined to not have been free, then the method will again proceed to decision operation 806 where it is again determined whether all ports have been checked and are busy.

Once all ports have been checked and have been ascertained to be busy, the method will proceed from operation 806 to operation 810, where the least busiest port is selected for transmission. Once the least busiest port has been selected for transmission, the method returns to operation 712 of FIG. 7A. In a like manner, if one port was ascertained to be free in operation 808, that port would be selected and the method would proceed to operation 712 of FIG. 7A. In sum, the selection of a new port is performed in a load balancing manner that first determines whether there are any free ports that may be used for transmission, and if there are no free ports, the method will proceed to select the least busiest port for transmission.

Figure 9:
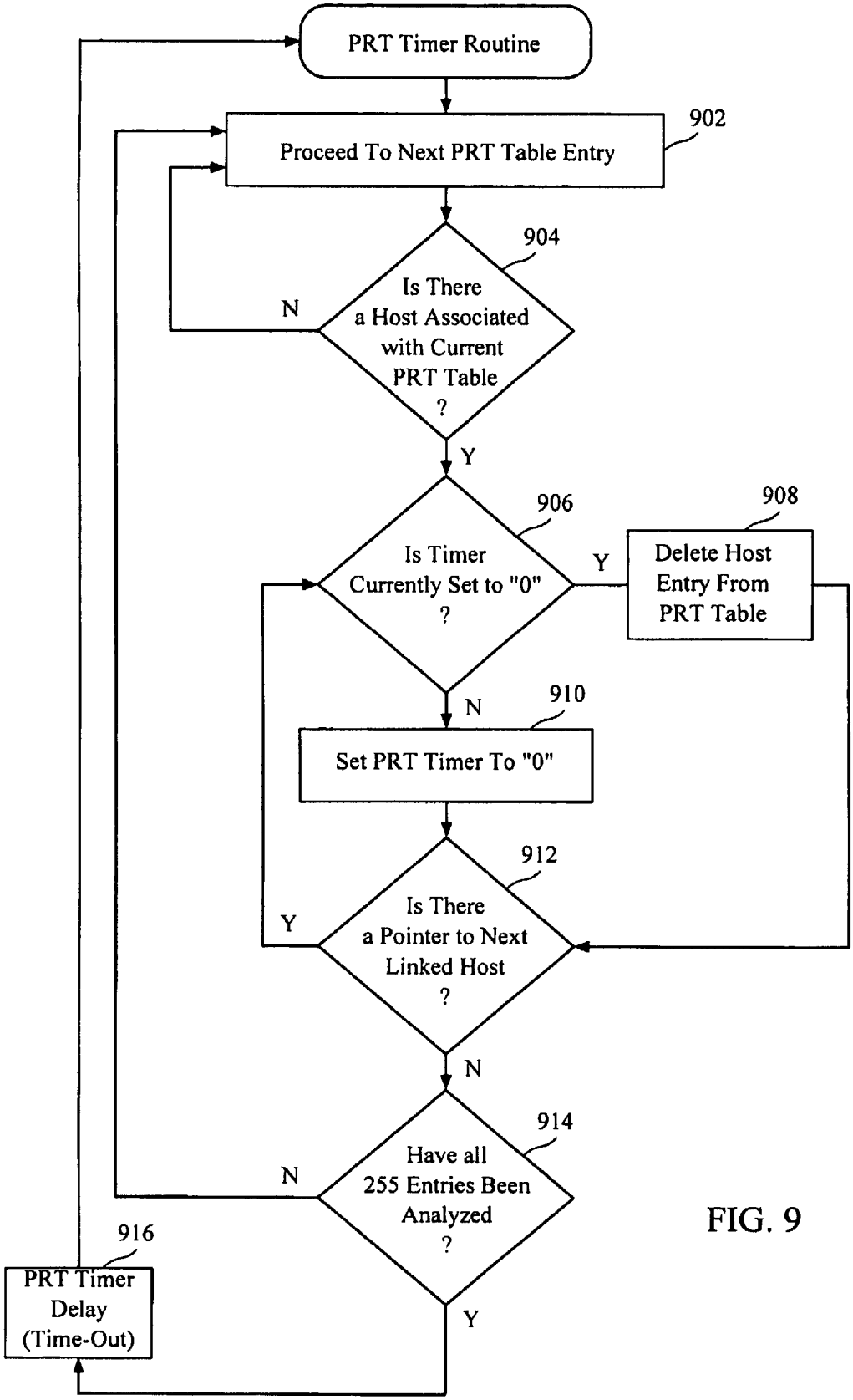
FIG. 9 is a flowchart diagram of the method operations performed in conducting the port resolution table timer routine in accordance with one embodiment of the present invention.

FIG. 9 is a flowchart diagram of the method operations performed in conducting a port resolution table (PRT) timer routine in accordance with one embodiment of the present invention. Once the multi-port NIC 130 has been initialized by the smart NIC driver 126 of FIG. 2, the method proceeds to an operation 902 where the routine marches through the PRT table entries beginning with entry 0 as shown in FIG. 7B. Once the method is at entry 0 in the table, the method will proceed to a decision operation 904 where it is determined whether there is a host associated with the current PRT table. As shown, entry 0 in PRT table does not currently have a linked host, and therefore the method will proceed back to operation 902.

In operation 902, the method will then proceed to the next entry in the PRT table. The next entry is entry number 2, which again does not satisfy the condition of operation 904, therefore, the method will again proceed to operation 902 where the method moves to entry number 3. Once at entry number 3, it is determined in decision operation 904 that there is a host associated with the current PRT table entry. At this point, the method proceeds to a decision operation 906 where it is determined whether the time of the parameters box 750 is currently set to "0." In this example, the timer is currently shown set to "1," and therefore the method proceeds to operation 910 where the PRT timer is re-set to "0" as shown in parameters box 750a.

On the other hand, if it is determined in operation 906 that the timer was already set to "0," then the method would proceed to operation 908, where the host entry would be deleted from the PRT table as shown in FIG. 7C. The removal of Host C 132c from the PRT table essentially means that port $P_1$ was idle for at least a predetermined PRT timer delay time-out. In one embodiment, the PRT timer delay (TIMEOUT) is calibrated for performance optimization to a time of between about ¼ second and 1 second, and most preferably about ½ second. Of source, these preferred optimizations may vary depending on network loading as well as other factors.

Once Host C 132c entry is removed from the PRT table as shown in FIG. 7C, the method will proceed to an operation 912 where it is determined whether there is a pointer to a next doubly linked host. As shown in FIG. 7B, the parameters box 752 of host C 132c do not point to a next doubly linked host, and therefore the method will proceed to an operation 914. In operation 914 it is determined whether all of the 255 entries have already been analyzed. Because in this example all 255 entries have not yet been analyzed, the method will proceed back up to operation 902 where the method proceeds to the next PRT table entry. Once at the next PRT table entry, the method will continue looping through operations 904 and 902 until a host is associated with a current PRT table entry. As mentioned above, the next PRT table entry having a host associated with it is entry number 70 as shown in FIG. 7B. At this point, it is determined if the timer of the parameters box 752 of Host A 132a is set to 0. Because the timer is set to "1," the method will proceed to operation 910 where the PRT timer is set to "0."

Once the timer is set to "0," the method will proceed to decision operation 912 where it is determined if there is a pointer to a next doubly linked host. Because Host B 132b is doubly linked to Host A 132a, the method will proceed back to operation 906 where it is determined if the timer of the parameters box 754 is set to "0." Because the timer is currently set to "1," the method will proceed to operation 910 where the timer is set to "0." On the other hand, if the timer had been set to 0 as shown in parameters box 754a, the method would have proceeded to operation 908 where the host would be deleted from the PRT table as shown in FIG. 7C. This process will therefore continue until all 255 entries have been analyzed and the method will proceed to operation 916, where the routine will wait for a PRT timer delay (TIMEOUT). Once the TIMEOUT is complete, the method will again proceed through the PRT timer routine and commence marching through each of the entries beginning with 0, and checking the timers of each host that is currently linked (or doubly-linked) with an entry of the PRT table.

As mentioned above, if the timer of any host was previously set to 0 in a prior PRT timer routine, that host will be deleted as an entry to the PRT table as described with reference to operation 908 of FIG. 9. As such, when a host is deleted from the PRT table, the port number allocated to that host will likewise become available when a new packet transfer operation is requested to a new remote host not currently linked to the table, or the same port link may again be re-established.

Figure 10:
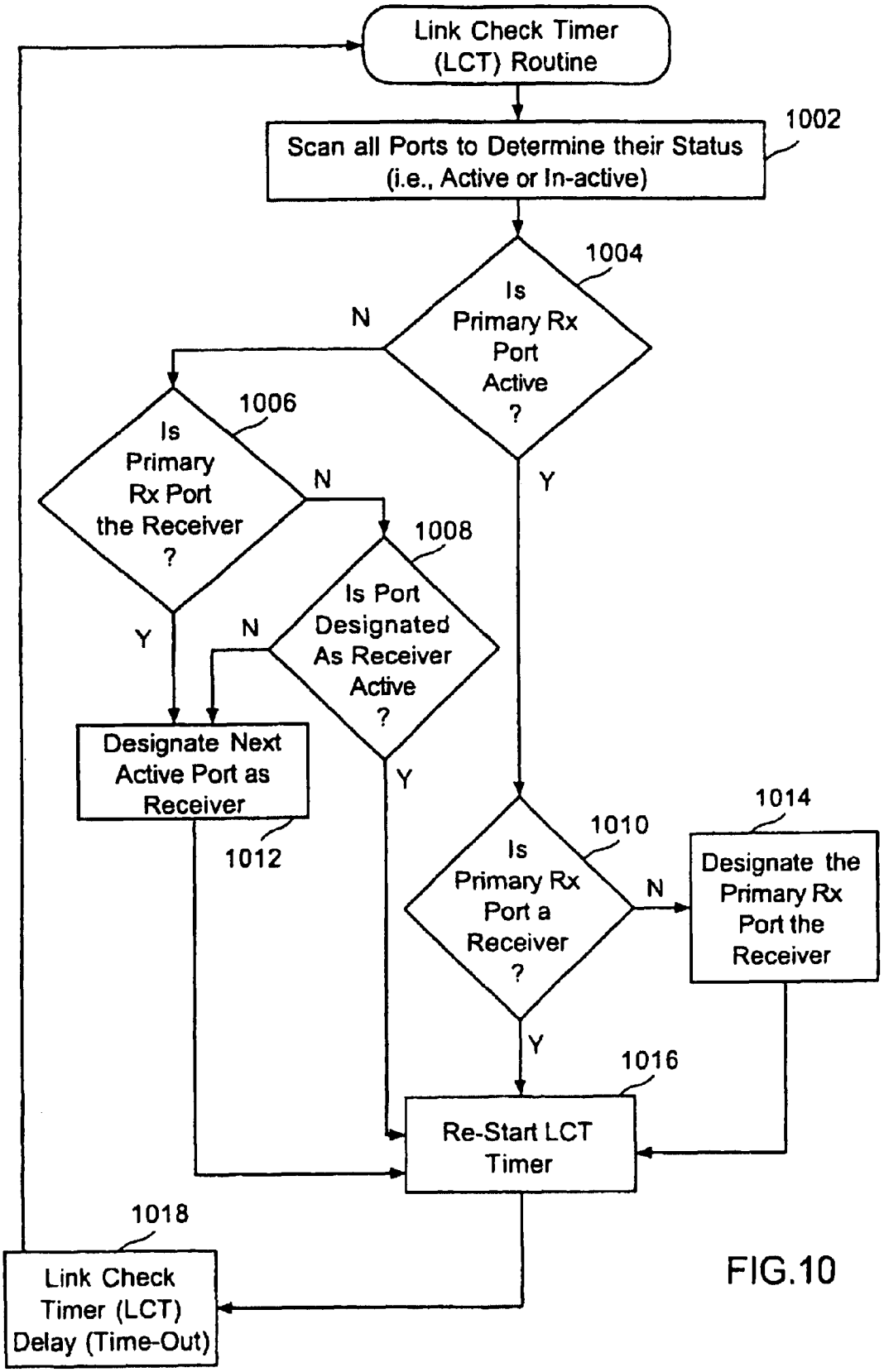
FIG. 10 is a flowchart diagram illustrating the method operations associated with performing a link check timer (LCT) routine in accordance with one embodiment of the present invention.

FIG. 10 is a flowchart diagram illustrating the method operations associated with performing a link check timer (LCT) routine in accordance with one embodiment of the present invention. The link check timer routine begins at an operation 1002 where all ports of the multi-port NIC 130 are scanned to determine their status. By way of example, each port is examined to ascertain whether it is active or inactive. Once all ports have been scanned to determine their status in operation 1002, the method proceeds to a decision operation 1004 where it is determined whether the primary Rx port is active. As mentioned in FIG. 4 above, port $P_1$ is preferably designated as the primary Rx port, which is assigned with all receiving tasks while it is active.

Therefore, if it is determined that the primary Rx port is active, the method will proceed to a decision operation 1010 where it is determined if the primary Rx port is functioning as the receiver. By way of example, if the primary Rx port had previously failed for any reason, the receiving tasks would have been assigned to the next available active port. However, assuming that the primary Rx port is the receiver, the method will proceed to an operation 1016 where the LCT timer is re-started.

On the other hand, if it is determined that the primary Rx port is not currently the receiver in operation 1010, the method would proceed to an operation 1014 where the primary Rx port would be designated as the receiver, because it was determined in operation 1004 that the primary Rx port was active. Then, once the primary port Rx is designated as the receiver, the method would proceed to operation 1016 where the LCT timer would be restarted. Referring back to operation 1004, if it is determined that the primary Rx port is not active, then the method would proceed to a decision operation 1006.

In decision operation 1006, it is determined whether the primary Rx port is currently designated as the receiver. By way of example, assuming that the primary Rx port was functioning as the receiver, and then failed to operate properly (i.e., not active) in operation 1004, then the receiving tasks would have to be assigned to another port. Therefore, if the primary Rx port is currently the receiver and it is no longer active, the method would proceed to an operation 1012, where the next active port (selected in a round robin orientation) would be designated as the receiver. On the other hand, if it was determined in operation 1006 that the primary Rx port was not the receiver, the method would proceed to a decision operation 1008 where it is determined if the port designated as the receiver is active.

By way of example, assuming that the primary Rx port was not functioning as the receiver, and the port assigned all receiving functions also became inactive as determined in operation 1008, the method would proceed to operation 1012 where the next active port would be designated as a receiver. On the other hand, if the port designated as the receiver in operation 1008 was active, the method would proceed to operation 1016 where the LCT timer would be re-started as described above. Once the LCT timer is restarted in operation 1016, the method will proceed to an operation 1018 where a link check timer delay (TIMEOUT) would commence. In one embodiment, the LCT time-out is preferably set by the user to be between about 1 second and about 10 seconds, and most preferably, about 2 seconds. Of course, these LCT time-out parameters may be modified outside the preferred times to fit well within networks of varying load requirements. After the TIMEOUT of operation 1018, the method will proceed through the link check timer routine again as described above.

Tables A through D below illustrate the re-assignment of receiver functions to the active ports when the port assigned the receiving functions fails to operate due to software errors, hardware errors, network over-loading errors, or a combination thereof. In table A below, all ports are currently active, and the primary Rx port $P_1$ is assigned all receiving functions. As such, each port will have its own MAC address, and transmits will be performed with their own source addresses attached to the packet.

TABLE A

| Ports | MAC Address | Source Address |
|---|---|---|
| Port $P_1$ (Active) (Primary Rx) * Receiver | MAC-1 | SA-1 |
| Port $P_2$ (Active) | MAC-2 | SA-2 |
| Port $P_3$ (Active) | MAC-3 | SA-3 |
| Port $P_4$ (Active) | MAC-4 | SA-4 |

When port $P_1$ fails for any reason, the smart NIC driver 126 will look to the next active port, and assign the receiving functions to that port. As illustrated in Table B below, port $P_2$ is now the receiver. As mentioned above, because port $P_2$ is now the receiver, it will be assigned the MAC address of port $P_1$, and when port $P_2$ transmits out, it will transmit packets with the source address SA-1 of port $P_1$.

TABLE B

| Ports | MAC Address | Source Address |
|---|---|---|
| Port $P_1$ (Down) (Primary Rx) | MAC-1 | SA-1 |
| Port $P_2$ (Down) | MAC-1 | SA-1 |
| * Receiver | | |
| Port $P_3$ (Active) | MAC-3 | SA-3 |
| Port $P_4$ (Active) | MAC-4 | SA-4 |

If after an LCT timer routine it is determined that port $P_2$ is no longer active (operation 1008), then the smart NIC driver 126 will designate the next active port as the receiver. As shown in Table C below, the next active port is port $P_3$. Because port $P_3$ is now the receiver, it will be assigned the MAC address of the primary Rx port $P_1$, and any transmits performed from port $P_3$ will have the source address SA-1.

TABLE C

| Ports | MAC Address | Source Address |
|---|---|---|
| Port $P_1$ (Down) (Primary Rx) | MAC-1 | SA-1 |
| Port $P_2$ (Down) | MAC-2 | SA-2 |
| Port $P_3$ (Active) | MAC-1 | SA-1 |
| * Receiver | | |
| Port $P_4$ (Active) | MAC-4 | SA-4 |

When the link check timer routine is performed again after the predetermined timeout, the smart NIC driver 126 will proceed to decision operation 1004 where it will be determined that the primary Rx port P1 is again active as shown in Table D below. As such, the primary Rx port will be once again designated as the receiver as described in operation 1014, after it is determined that the primary Rx port was not the receiver in operation 1010, and shown in Table C above.

TABLE D

| Ports | MAC Address | Source Address |
|---|---|---|
| Port $P_1$ (Active) (Primary Rx) | MAC-1 | SA-1 |
| * Receiver | | |
| Port $P_2$ (Down) | MAC-2 | SA-2 |
| Port $P_3$ (Active) | MAC-3 | SA-3 |
| Port $P_4$ (Active) | MAC-4 | SA-4 |

The present invention may be implemented using any type of integrated circuit logic or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 11:
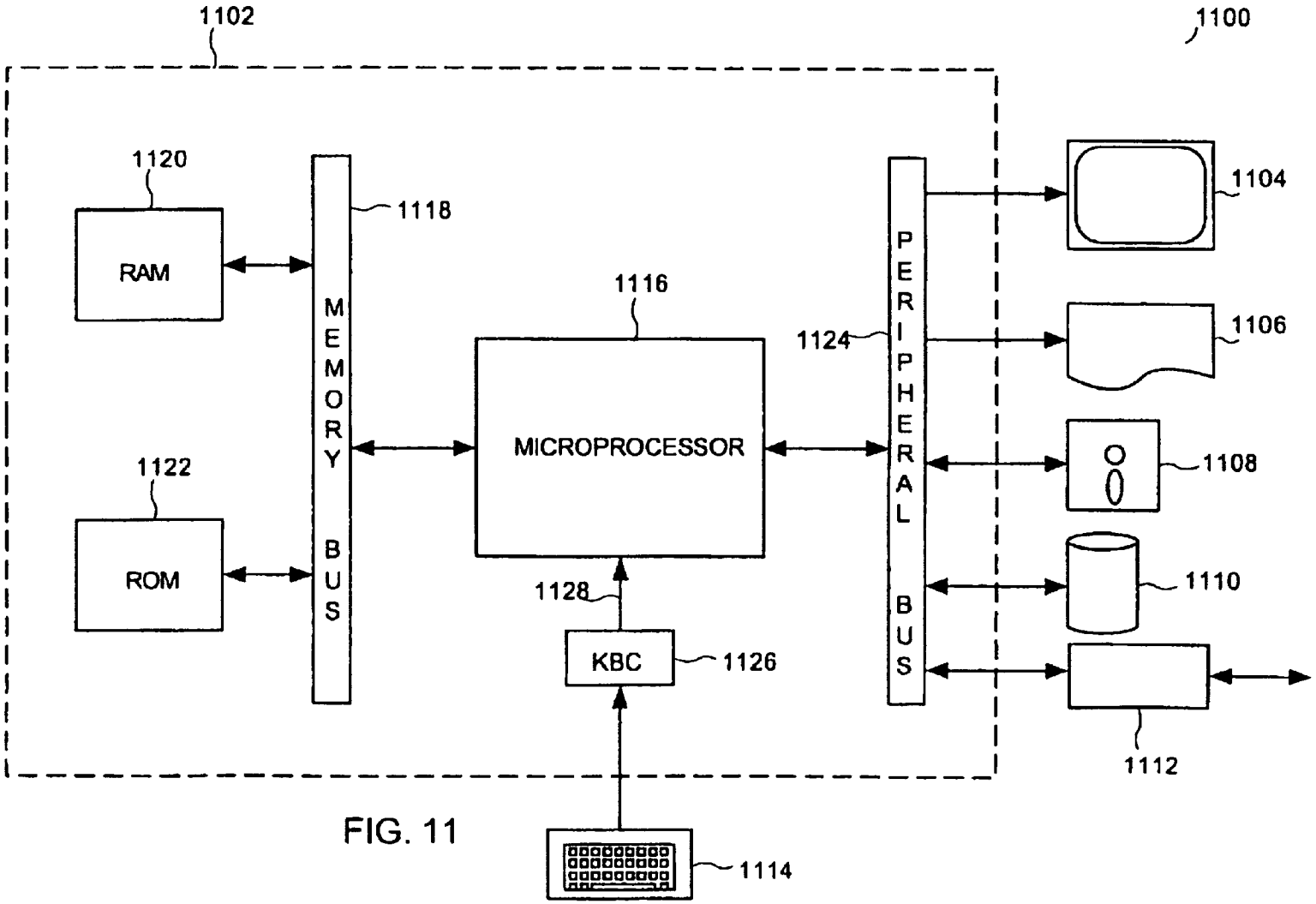
FIG. 11 is a block diagram of an exemplary computer system for carrying out the processing according to the invention.

FIG. 11 is a block diagram of an exemplary computer system 1100 for carrying out the processing according to the invention. The computer system 1100 includes a digital computer 1102, a display screen (or monitor) 1104, a printer 1106, a floppy disk drive 1108, a hard disk drive 1110, a network interface 1112, and a keyboard 1114. The digital computer 1102 includes a microprocessor 1116, a memory bus 1118, random access memory (RAM) 1120, read only memory (ROM) 1122, a peripheral bus 1124, and a keyboard controller 1126. The digital computer 1100 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1116 is a general purpose digital processor which controls the operation of the computer system 1100. The microprocessor 1116 can be a single-chip processor or can be implemented with multiple components. Using instructions retrieved from memory, the microprocessor 1116 controls the reception and manipulation of input data and the output and display of data on output devices. According to the invention, a particular function of microprocessor 1116 is to assist in the port aggregation and load balancing tasks controlled by smart NIC driver 126 of multiport NIC 130.

The memory bus 1118 is used by the microprocessor 1116 to access the RAM 1120 and the ROM 1122. The RAM 1120 is used by the microprocessor 1116 as a general storage area and as scratch-pad memory, and can also be used to store input data and processed data. The ROM 1122 can be used to store instructions or program code followed by the microprocessor 1116 as well as other data.

The peripheral bus 1124 is used to access the input, output, and storage devices used by the digital computer 1102. In the described embodiment, these devices include the display screen 1104, the printer device 1106, the floppy disk drive 1108, the hard disk drive 1110, and the network interface 1112. The keyboard controller 1126 is used to receive input from keyboard 1114 and send decoded symbols for each pressed key to microprocessor 116 over bus 1128.

The display screen 1104 is an output device that displays images of data provided by the microprocessor 1116 via the peripheral bus 1124 or provided by other components in the computer system 1100. The printer device 1106 when operating as a printer provides an image on a sheet of paper or a similar surface. Other output devices such as a plotter, typesetter, etc. can be used in place of, or in addition to, the printer device 1106.

The floppy disk driver 1108 and the hard disk drive 1110 can be used to store various types of data. The floppy disk drive 1108 facilitates transporting such data to other computer systems, and hard disk drive 1110 permits fast access to large amounts of stored data.

The microprocessor 1116 together with an operating system operate to execute computer code and produce and use data. The computer code and data may reside on the RAM 1120, the ROM 1122, or the hard disk drive 1110. The computer code and data could also reside on a removable program medium and loaded or installed onto the computer system 1100 when needed. Removable program mediums include, for example, CD-ROM, PC-CARD, floppy disk and magnetic tape.

The network interface 1112 is used to send and receive data over a network connected to other computer systems. An interface card or similar device and appropriate software implemented by the microprocessor 1116 can be used to connect the computer system 1100 to an existing network and transfer data according to standard protocols.

The keyboard 1114 is used by a user to input commands and other instructions to the computer system 1100. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. *The examples listed in the prior sentence are examples of computer readable storage media.* The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. In addition, it should be understood that the various processing functions described above may be implemented both in silicon as hardware integrated circuits, or as software code that may be stored and retrieved from any suitable storage medium. Accordingly, the present embodiments are to be considered as illustrative and not restrictive, and the invention is not to be limited to the details given herein, but may be modified within the scope and equivalents of the appended claims.

What is claimed is:

1. A [process] *method* for driving a network interface card, comprising:

providing a multi-port network interface card on a *stand-alone* computer, the multi-port network interface card having at least three ports for connecting the *stand-alone* computer to [a] *one* network, the at least three ports being capable of transmitting data from the *stand-alone* computer to the network as transmit ports at the same time to a remote host *attached to the network* at an aggregated bandwidth of the at least three ports, a selected port from the at least three ports being capable of receiving data from the network as a primary receiving port, wherein the multi-port network interface card is configured to transmit new data over a selected transmit port while transmitting other data over the other transmit ports at the same time so as to improve load balancing of data from the *stand-alone* computer;

initializing each of the at least three ports, the initializing further including, ascertaining the connection type for the ports, and scanning the indices of a lookup table to determine if the ports are active;

creating registry groups by selecting ports from the at least three ports;

defining start time-out values to assist in the efficient load balancing of active ports;

monitoring a status of the at least three ports between the *stand-alone* computer and the network;

detecting a failure in one of the at least three ports that connect the *stand-alone* computer to the network;

upon detecting the failure in one of the ports, re-assigning data to be transmitted over the failed one of the at least three ports to an active port of the at least three ports, the active port being selected [in a round robin technique] *in a manner* such that data transfer load is automatically redistributed over active ports; and receiving data over one of the at least three ports designated as the primary receiving port.

2. A [process] *method* for driving a network interface card as recited in claim 1, wherein when the failed one of the at least three ports is the primary receiving port and wherein the receiving is assigned to a *selected* next active port [selected in a round robin technique].

3. A [process] *method* for driving a network interface card as recited in claim 2, wherein the *selected* next active port [selected in the round robin technique] is assigned a media access control address of the primary receiving port.

4. A [process] *method* for driving a network interface card as recited in claim 3, wherein the network interface card transmits the new data in a load balanced manner over the at least three ports by:

examining the at least three ports to determine whether any one of the at least three ports is free, if one or more ports are determined to be free, assigning data transfer to a next free port selected in a round robin manner; and if no ports are determined to be free, assigning data transfer to a least busiest port among the more than two ports.

5. A [process] *method* for driving a network interface card as recited in claim 4, wherein the load-balanced configuration produces an increase in throughput between the *stand-alone* computer and the network.

6. A [process] *method* for driving a network interface card as recited in claim 3, wherein when the next active port transmits data, the transmitted data is tagged with the media access control address of the primary receiving port.

7. A [process] *method* for driving a network interface card as recited in claim 1, further comprising:

scanning the plurality of ports to ascertain whether each of the at least three ports is active;

determining whether the primary port is active based on the scanning;

determining that the primary port is not active;

determining that the primary port is assigned *as* the receiving *port*; and assigning a next active port of the plurality of ports [with] *as* the receiving *port*.

8. A [process] *method* for driving a network interface card as recited in claim 7, wherein the scanning the at least three ports to ascertain whether each of the at least three ports is active is periodically performed through a link check timer routine.

9. A [process] *method* for driving a network interface card as recited in claim 8, wherein the link check timer routine has a time-out interval of between about 1 second and about 10 seconds.

10. A [process] *method* for driving a network interface card as recited in claim 3, wherein the network interface card is configured through a graphical user interface, the configuration comprising:

performing a port configuration to assign a bandwidth to each of the at least three ports;

performing a grouping of selected ones of the at least three ports to attain a group of load balanced transmission ports; and initializing the configured ports and the group of load balanced transmission ports.

11. A [process] *method* for driving a network interface card as recited in claim 10, wherein the graphical user interface includes a ports configuration window for listing each of the at least three ports, and a configuration pull down window for manually assigning bandwidths or auto detecting a default connection of selected ones of the at least three ports listed in the ports configuration window.

12. A [process] *method* for driving a network interface card as recited in claim 10, wherein the graphical user interface includes a port aggregation window for performing the grouping of selected ones of the at least three ports, and a status window for displaying an activity of each of the at least three ports assigned to selected groups of load balanced transmission ports.

13. A method for transmitting and receiving data over a network from a server computer system, comprising:

providing a multi-port network interface card on the server computer system, the multi-port network interface cad having at least three ports for connecting the server computer system to a network, the at least three ports being capable of transmitting data from the computer as transmit ports at the same time to a remote host at an aggregated bandwidth of the at least three ports, a selected port from the at least three ports being capable of receiving data from the network as a primary receiving port, wherein the multi-port network interface card is configured to transmit new data over a selected transmit port while transmitting other data over the other transmit ports at the same time so as to improve load balancing of data from the computer to the network;

connecting the server computer system with the network through the at least three ports for communicating with a plurality of remote hosts coupled to the network;

transmitting a load of data from the server computer system through the at least three ports to the plurality of remote hosts, the transmitting further including, retrieving a destination address from the load of data, and determining whether the destination address is listed in a lookup table;

detecting, by the server computer system, a failure in one of the at least three ports during a transmit to a selected one of the plurality of remote hosts; and redistributing, by the server computer system, the load of data assigned to the failed one of the at least three ports to an available port of the plurality of ports, the redistributing further including, determining if the available port is free by referring to the lookup table.

14. A method for transmitting and receiving data over a network from a server computer system as recited in claim 13, further comprising:

receiving data through one of the at least three ports designated as a primary receiving port.

15. A method for transmitting and receiving data over a network from a server computer system as recited in claim 14, wherein when the primary receiving port fails, the method further comprises:

receiving data through a next active port of the at least three ports selected in a round robin orientation.

16. A method for transmitting and receiving data over a network from a server computer system as recited in claim 15, wherein when the next active port of the at least three ports is selected in response to a failure in the primary receiving port, wherein a port address of the primary receiving port is assigned to the next active port.

17. A method for transmitting and receiving data over a network from a server computer system as recited in claim 16, wherein when a data packet is transmitted through the next active port, the data packet will transmit with the port address of the primary receiving port.

18. A method for transmitting and receiving data over a network from a server computer system as recited in claim 17, wherein when the server computer receives data, the data is addressed to the port address of the primary receiving port when the primary receiving port is active as well as when the primary port is inactive, and the next active port is receiving.

19. A method for transmitting and receiving data over a network from a server computer system as recited in claim 13, further comprising:

monitoring activity of a plurality of links connecting the plurality of ports to selected ones of the plurality of remote hosts;

detecting a failure in one of the plurality of links;

redistributing the load of data assigned to one of the at least three ports connected to the failed one of the plurality of links to an available port of the at least three ports, such that the available port is connected to an active one of the plurality of links.

20. A method for transmitting and receiving data over a network from a server computer system as recited in claim 13, wherein the available port is a free port that is not currently transmitting.

21. A method for transmitting and receiving data over a network from a server computer system as recited in claim 20, wherein each of the at least three ports including the available port is currently transmitting; and selecting a least busy port of the at least three ports after detecting the failure in one of the at least three ports.

22. A computer readable *storage* media containing program instructions for driving a multi-port network interface card having at least three ports for connecting a *stand-alone* computer system to [a] *one* network, the computer readable media comprising:

program instructions for monitoring a status of the at least three ports of the multi-port network card that connects the computer to the network, the at least three ports being capable of transmitting data from the *stand-alone* computer *system* to the network as transmit ports at the same time to a remote host *attached to the network* at an aggregated bandwidth of the at least three ports, a selected port from the at least three ports being capable of receiving data from the network as a primary receiving port, wherein the multi-port network interface card is configured to transmit new data over a selected transmit port while transmitting other data over the other transmit ports at the same time so as to improve load balancing of data from the *stand-alone* computer *system* to the network;

program instructions for building a port resolution table indexing connections to at least one remote host *attached to the network* that is communicating through a selected one of the at least three ports, the building further including instructions for, determining whether a host *attached to the network* is associated with the port resolution table by referring to a timer parameter;

program instructions for periodically updating the port resolution table after a predetermined time-out; and program instructions for performing a link check timer routine, the performing further including instructions for, determining if a receiver port of the at least three ports is active.

23. A computer readable *storage* media containing program instructions for driving a network interface card as recited in claim 22, wherein the at least one remote host *attached to the network* is assigned host parameters identifying a media access control address of the at least one remote host *attached to the network*, a number assigned to the selected one of the at least three ports, and a timer.

24. A computer readable *storage* media containing program instructions for driving a network interface card as recited in claim 22, wherein the timer is set to a logical one when communication is active through the selected one of the at least three ports.

25. A computer readable *storage* media containing program instructions for driving a network interface card as recited in claim 23, wherein the timer is set to a logical zero when communication is not active through the selected one of the at least three ports after the predetermined time-out.

26. A computer readable *storage* media containing program instructions for driving a network interface card as recited in claim 23, further comprising:

program instructions for removing the port resolution table index for the at least one remote host *attached to the network* when the timer is already set to the logical zero and a pass is made through the port resolution table.

27. A computer readable *storage* media containing program instructions for driving a network interface card as recited in claim 23, wherein the when more than one remote host *attached to the network* is indexed to a same port resolution table entry, the more than one remote hosts are doubly linked to the same port resolution table entry.

28. A computer readable *storage* media containing program instructions for driving a network interface card as recited in claim 27, wherein the host parameters includes pointers for the doubly linked remote hosts *attached to the network*.

29. A computer readable *storage* media containing program instructions for driving a network interface card as recited in claim 22, wherein the predetermined time-out is between about ¼ second and about 1 second.

30. A computer readable *storage* media containing program instructions for driving a network interface card having at least three ports for connecting a *stand-alone* computer system to [a] *one* network, comprising:

program instructions for monitoring a status of the at least three ports of the network interface card connected between the *stand-alone* computer *system* and the network, the at least three ports being capable of transmitting data from the *stand-alone* computer *system* to the network as transmit ports at the same time to a remote host *attached to the network* at an aggregated bandwidth of the at least three ports, a selected port from the at least three ports being capable of receiving data from the network as a primary receiving port, wherein the multi-port network interface card is configured to transmit new data over a selected transmit port while transmitting other data over the other transmit ports at the same time so as to improve load balancing of data from the *stand-alone* computer *system* to the network;

program instructions for initializing each of the at least three ports, the initializing further including instructions for, ascertaining the connection type for the ports, and scanning the indices of a lookup table to determine if the ports are active;

program instructions for detecting a failure in one of the at least three ports that connect the *stand-alone* computer system to the network;

program instructions for re-assigning data transmitted over the failed one of the at least three ports to an active port of the at least three ports selected [in a round robin technique] such that data transfer load is automatically redistributed over active ports; and program instructions for receiving data over one of the at least three ports designated as a primary receiving port.

31. A computer readable *storage* media containing program instructions for driving a network interface card as recited in claim 30, wherein when the failed one of the at least three ports is the primary receiving port, the receiving is assigned to a next active port [selected in a round robin technique].

32. A computer readable *storage* media containing program instructions for driving a network interface card as recited in claim 31, wherein the next active port [selected in the round robin technique] is assigned a media access control address of the primary receiving port.

33. An apparatus [for driving] *comprising:* a network interface card having at least three ports for connecting a *stand-alone* computer system to [a] *one* network[, the apparatus comprising:]*;*

*an apparatus for driving the network interface card, comprising:* means for monitoring the status of the at least three ports connected between the *stand-alone* computer *system* and the network, the at least three ports being capable of transmitting data from the *stand-alone* computer *system* to the network as transmit ports at the same time to a remote host *attached to the network* at an aggregated bandwidth of the at least three ports, a selected port from the at least three ports being capable of receiving data from the network as a primary receiving port, wherein the multi-port network interface card is configured to transmit new data over a selected transmit port while transmitting other data over the other transmit ports at the same time so as to improve load balancing of data from the *stand-alone* computer *system* to the network;

means for initializing each of the at least three ports, the initializing means further including, means for ascertaining the connection type for the ports, and means for [scanning the indices of a lookup table to determine if] *determining which of* the ports are active;

means for detecting a failure in one of the at least three ports connected to the network;

means for re-assigning data transmitted over the failed one of the at least three ports to [an active port] *one* of the at least three ports *that has been determined to be active,* selected [in a round robin technique] such that data transfer load is automatically redistributed over active ports; and means for receiving data over one of the at least three ports designated as a primary receiving port.

34. An apparatus [for driving a network interface card] as recited in claim 33, wherein when the failed one of the at least three ports is the primary receiving port, the receiving is assigned to a next active port [selected in a round robin technique].

35. An apparatus [for driving a network interface card] as recited in claim 34, wherein the next active port [selected in the round robin technique] is assigned a media access control address of the primary receiving port.

*36. The apparatus for in claim 33, wherein the means for determining which of the at least three ports are active further includes a means for scanning the indices of a lookup table to determine if the ports are active.*

* * * * *

UNITED STATES PATENT AND TRADEMARK OFFICE

CERTIFICATE OF CORRECTION

PATENT NO. : RE 41,397 E
APPLICATION NO. : 10/704464
DATED : June 22, 2010
INVENTOR(S) : Faisal Latif et al.

It is certified that error appears in the above-identified patent and that said Letters Patent is hereby corrected as shown below:

Please replace claim 36 (column 24, line 8) with:

36. The apparatus as recited in claim 33, wherein the means for determining which of the at least three ports are active further includes a means for scanning the indices of a lookup table to determine if the ports are active.

Signed and Sealed this

Seventeenth Day of August, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : RE41,397 E
APPLICATION NO. : 10/704464
DATED : June 22, 2010
INVENTOR(S) : Faisal Latif et al.

It is certified that error appears in the above-identified patent and that said Letters Patent is hereby corrected as shown below:

Please replace claim 13 (column 19, line 35) with:

13. A method for transmitting and receiving data over one network from a stand-alone server computer system, comprising:

providing a multi-port network interface card on the stand-alone server computer system, the multi-port network interface card having at least three ports for connecting the stand-alone server computer system to one network, the at least three ports being capable of transmitting data from the stand-alone server computer system as transmit ports at the same time to a remote host attached to the network at an aggregated bandwidth of the at least three ports, a selected port from the at least three ports being capable of receiving data from the network as a primary receiving port, wherein the multi-port network interface card is configured to transmit new data over a selected transmit port while transmitting other data over the other transmit ports at the same time so as to improve load balancing of data from the stand-alone server computer system to the network;

connecting the stand-alone server computer system with the one network through the at least three ports for communicating with a plurality of remote hosts attached to the network;

transmitting a load of data from the stand-alone server computer system through the at least three ports to the plurality of remote hosts, the transmitting further including, retrieving a destination address from the load of data; and selecting a first of the at least three ports through which to transmit the load of data using in this selection process the destination address contained in the load of data;

detecting, by the stand-alone server computer system, a failure of the first of the at least three ports during a transmit to a selected one of the plurality of remote hosts; and selecting a second of the at least three ports through which to transmit the load of data, the selection process including a determination that the second port is available and functioning; and Signed and Sealed this
Third Day of May, 2011

David J. Kappos

David J. Kappos
*Director of the United States Patent and Trademark Office* redistributing, by the stand-alone server computer system, the load of data assigned to the first of the at least three ports to the second of the at least three ports.

Column 20, claim 14, at line 3, please delete “a” and replace with --one--

Column 20, claim 14, at line 4, before “server”, please insert --stand-alone--

Column 20, claim 15, at line 8, please delete “a” and replace with --one--

Column 20, claim 15, at line 9, before “server”, please insert --stand-alone--

Column 20, claim 15, at line 13, please delete “ports selected in a round robin orientation.” and replace with --port.--

Column 20, claim 16, at line 14, please delete “a” and replace with --one--

Column 20, claim 16, at line 15, before “server”, please insert --stand-alone--

Column 20, claim 17, at line 20, please delete “a” and replace with --one--

Column 20, claim 17, at line 21, before “server”, please insert --stand-alone--

Column 20, claim 18, at line 25, please delete “a” and replace with --one--

Column 20, claim 18, at line 26, before “server”, please insert --stand-alone--

Column 20, claim 18, at line 27, please delete “server computer”, and replace with --stand-alone server computer system--

Column 20, claim 19, at line 31, please delete “a” and replace with --one--

Column 20, claim 19, at line 32, before “server”, please insert --stand-alone--

Column 20, claim 20, at line 44, please delete “a” and replace with --one--

Column 20, claim 20, at line 45, before “server”, please insert --stand-alone--

Column 20, claim 21, at line 48, please delete “a” and replace with --one--

Column 20, claim 21, at line 49, before “server”, please insert --stand-alone--

Column 24, claim 34, at line 1, after “port,”, please insert --and--